US011207677B2

(12) United States Patent
Krauss et al.

(10) Patent No.: US 11,207,677 B2
(45) Date of Patent: Dec. 28, 2021

(54) DEVICES, SYSTEMS, AND METHODS FOR DETECTING SUBSTANCES

(71) Applicant: University of Virginia Patent Foundation, Charlottesville, VA (US)

(72) Inventors: Shannon Theresa Krauss, Pelham, NH (US); James P. Landers, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 207 days.

(21) Appl. No.: 16/225,527

(22) Filed: Dec. 19, 2018

(65) Prior Publication Data

US 2019/0275518 A1    Sep. 12, 2019

Related U.S. Application Data

(60) Provisional application No. 62/781,044, filed on Dec. 18, 2018, provisional application No. 62/639,708, filed on Mar. 7, 2018.

(51) Int. Cl.
*G01N 1/02* (2006.01)
*G01N 21/78* (2006.01)
*B01L 3/00* (2006.01)

(52) U.S. Cl.
CPC .......... *B01L 3/502715* (2013.01); *G01N 1/02* (2013.01); *G01N 21/78* (2013.01); *G01N 2001/027* (2013.01); *G01N 2001/028* (2013.01)

(58) Field of Classification Search
CPC ... B01L 3/502715; B01L 3/5027; G01N 1/02; G01N 21/78; G01N 2001/027; G01N 2001/028
See application file for complete search history.

(56) References Cited

U.S. PATENT DOCUMENTS 7,223,325 B2    5/2007 Landers et al.
7,381,471 B2    6/2008 Augustine et al.
(Continued)

FOREIGN PATENT DOCUMENTS

WO    WO 2002/048673    6/2002
WO    WO 2003/104774    12/2003
(Continued)

OTHER PUBLICATIONS

Becker, H., et al., "Polymer microfabrication methods for microfluidic analytical applications", Electrophoresis, 2000, pp. 12-26, vol. 21, No. 1.
(Continued)

*Primary Examiner* — Brian J. Sines
(74) *Attorney, Agent, or Firm* — Robert J. Decker

(57) ABSTRACT

A microfluidic device for the detection of drugs, explosives, chemical warfare, or other substances which is able to directly accept a swab into the device for testing. This device additionally contains on-board reagents to perform colorimetric testing for threshold determination directly in the device. These features are useful in a wide array of situations, such as at security checkpoints, environmental monitoring, clinical analysis, which require testing completely unknown substances and therefore must test for multiple different substances in one test. This is especially useful for police and other law enforcement officials who often must use field-deployable platforms making accurate field-testing critical for safety.

42 Claims, 19 Drawing Sheets

(56) References Cited

U.S. PATENT DOCUMENTS

| | | |
|---|---|---|
| 7,534,623 B2 | 5/2009 | Landers et al. |
| 7,815,802 B2 | 10/2010 | Wen et al. |
| 8,056,881 B2 | 11/2011 | Landers et al. |
| 8,220,493 B2 | 7/2012 | Easley et al. |
| 8,343,755 B2 | 1/2013 | Begley et al. |
| 8,403,294 B2 | 3/2013 | Landers et al. |
| 8,916,375 B2 | 12/2014 | Landers et al. |
| 9,044,735 B2 | 6/2015 | Wen et al. |
| 9,050,596 B2 | 6/2015 | Easley et al. |
| 9,304,065 B2 | 4/2016 | Fowler et al. |
| 9,915,616 B2 | 3/2018 | Smith |
| 9,987,576 B2 | 6/2018 | Landers et al. |
| 10,656,146 B2 | 5/2020 | Landers et al. |
| 2004/0035703 A1 | 2/2004 | Landers et al. |
| 2004/0131504 A1 | 7/2004 | Landers et al. |
| 2005/0252820 A1 | 11/2005 | Sanchez-Felix et al. |
| 2005/0287661 A1 | 12/2005 | Landers |
| 2006/0144707 A1 | 7/2006 | Landers et al. |
| 2007/0166721 A1 | 7/2007 | Phan et al. |
| 2008/0193961 A1 | 8/2008 | Easley et al. |
| 2008/0277387 A1 | 11/2008 | Landers et al. |
| 2009/0014388 A1 | 1/2009 | Wen et al. |
| 2009/0170092 A1 | 7/2009 | Landers et al. |
| 2009/0215124 A1 | 8/2009 | Cao et al. |
| 2011/0033922 A1 | 2/2011 | Landers et al. |
| 2011/0070660 A1 | 3/2011 | Landers et al. |
| 2011/0296639 A1* | 12/2011 | Strauss ............... A46B 7/04 15/145 |
| 2012/0149587 A1 | 6/2012 | Landers et al. |
| 2013/0004956 A1 | 1/2013 | Landers et al. |
| 2013/0084565 A1 | 4/2013 | Landers et al. |
| 2013/0157381 A1* | 6/2013 | Pang ............... G01N 33/53 436/501 |
| 2013/0203045 A1 | 8/2013 | Landers et al. |
| 2013/0288863 A1 | 10/2013 | Yamamoto et al. |
| 2013/0295602 A1 | 11/2013 | Fowler et al. |
| 2014/0017802 A1 | 1/2014 | Smith |
| 2014/0072960 A1* | 3/2014 | Lansing ............... G01N 33/571 435/5 |
| 2014/0134631 A1 | 5/2014 | Clime et al. |
| 2015/0093838 A1 | 4/2015 | Landers et al. |
| 2018/0304253 A1 | 10/2018 | Landers et al. |
| 2018/0313765 A1 | 11/2018 | Landers et al. |
| 2019/0054468 A1 | 2/2019 | Landers et al. |

FOREIGN PATENT DOCUMENTS

| | | |
|---|---|---|
| WO | WO 2004/007582 | 1/2004 |
| WO | WO 2004/027361 | 4/2004 |
| WO | WO 2004/033099 | 4/2004 |
| WO | WO 2004/046712 | 6/2004 |
| WO | WO 2005/033687 | 4/2005 |
| WO | WO 2005/079531 | 9/2005 |
| WO | WO 2006/039293 | 4/2006 |
| WO | WO 2006/044458 | 4/2006 |
| WO | WO 2006/069305 | 6/2006 |
| WO | WO 2006/088907 | 8/2006 |
| WO | WO 2006/093865 | 9/2006 |
| WO | WO 2007/024829 | 3/2007 |
| WO | WO 2007/030240 | 3/2007 |
| WO | WO 2007/041671 | 4/2007 |
| WO | WO 2007/047336 | 4/2007 |
| WO | WO 2008/058204 | 5/2008 |
| WO | WO 2008/080106 | 7/2008 |
| WO | WO 2009/114709 | 9/2009 |
| WO | WO 2010/141139 | 12/2010 |
| WO | WO 2010/141140 | 12/2010 |
| WO | WO 2011/056215 | 5/2011 |
| WO | WO 2011/150226 | 1/2012 |
| WO | WO 2012/151268 | 11/2012 |
| WO | WO 2012/151289 | 11/2012 |
| WO | WO 2014/093360 | 6/2014 |
| WO | WO 2017/019768 | 2/2017 |
| WO | WO 2017/066485 | 4/2017 |
| WO | WO 2017/070571 | 4/2017 |
| WO | WO 2017/070607 | 4/2017 |
| WO | WO 2018/148271 | 8/2018 |

OTHER PUBLICATIONS

Chin, C.D., et al., "Mobile Device for Disease Diagnosis and Data Tracking in Resource-Limited Settings", Clinical Chemistry, 2013, pp. 629-640, vol. 59, No. 4.

Choodum, A., et al., "A sol-gel colorimetric sensor for methamphetamine detection", Sensors and Actuators B: Chemical: International Journal Devoted to Research and Development of Physical and Chemical Transducers, Apr. 14, 2015, pp. 553-560, vol. 215.

Coltro, W.K.T., et al., "Toner and paper-based fabrication techniques for microfluidic applications", Electrophoresis, 2010, pp. 2487-2498, vol. 31, No. 15.

Fiorini, G.S., et al., "Disposable microfluidic devices: fabrication, function, and application", Biotechniques, Mar. 2005, pp. 429-446, vol. 38, No. 3.

Hargreaves, M.D., et al., Analysis of seized drugs using portable Raman spectroscopy in an airport environment—a proof of principle study, Journal of Raman Spectroscopy, 2008, pp. 873-880, vol. 39, Iss. 7.

Krauss, S., "Development of Portable Sample-ln-Answer-Out Microfluidic Systems for On-Site Analyte Detection", A Dissertation presented to the Graduate Faculty of the University of Virginia in Candidacy for the Degree of Doctor of Philosophy, May 2018, 294 pages.

Krauss, S., et al., "First-Generation Narcdisc™: Cost-Effective Printed Microdevices For Screening of Narcotics at the Point of Interdiction With Cell Phone Detection", 19th International Conference on Miniaturized Systems for Chemistry and Life Sciences, Oct. 29, 2015, pp. 1810-1812.

Krauss, S., et al., "Objective Method for Presumptive Field-Testing of Illicit Drug Possession Using Centrifugal Microdevices and Smartphone Analysis", Analytical Chemistry, 2016, pp. 8689-8697, vol. 88, No. 17.

Le Roux, D., et al., "An integrated sample-in-answer-out microfluidic chip for rapid human identification by STR analysis", Lab on a Chip, Royal Society of Chemistry, 2014, pp. 4415-4425.

Madou, M.J., et al., "The LabCD™: A Centrifuge-Based Microfluidic Platform for Diagnostics", Proceedings of SPIE, Systems and Technologies for Clinical Diagnostics and Drug Discovery, 1998, pp. 80-93, vol. 3259.

Manz, A., et al, Miniaturized Total Chemical Analysis Systems—a Novel Concept for Chemical Sensing, Sensors and Actuators, B1-Chemical, 1990, pp. 244-248, vol. 1, No. 1-6.

Manz, A., et al., "Miniaturization of Chemical Analysis Systems—A Look into Next Century's Technology or Just a Fashionable Craze?", Chimia, Apr. 1991, pp. 103-105, vol. 45, No. 4.

Ouyang, Y., et al., "Multilevel fluidic flow control in a rotationally driven polyester film microdevice created using laser print, cut and laminate", Lab on a Chip, The Royal Society of Chemistry, Dec. 16, 2015, pp. 377-387, vol. 16, No. 2.

Thompson, B., et al., "Inexpensive, rapid prototyping of microfluidic devices using overhead transparencies and a laser print, cut and laminate fabrication method", Nature Protocols, May 14, 2015, pp. 875-886, vol. 10, No. 6.

Thompson, B., et al., "Protein Quantitation from Whole Blood on Polyester-Toner Laser-Printed Microfluidic Discs with Cell Phone Image Analysis", 18th International Conference on Miniaturized Systems for Chemistry and Life Sciences, Oct. 26, 2014, pp. 1434-1326, XP0553334290, URL:http//www.rsc.org/images/loc/2014/PDFs/Papers/474_0913.pdf.

Valussi, S., et al., "Raman and infrared techniques for fighting drug-related crime: a preliminary assessment", Proceedings of SPIE—The International Society for Optical Engineering, 2006, pp. 640201-1-640201-12, vol. 6402.

Whitesides, G.M., et al., "Soft Lithography in Biology and Biochemistry", Annual Review of Biomedical Engineering, 2001, pp. 335-373, vol. 3.

(56) References Cited

OTHER PUBLICATIONS

Xia, Y.N., et al., "Soft lithography", Angewandte Chemie-International Edition, 1998, pp. 550-575, vol. 37, No. 5.

* cited by examiner

DEVICES, SYSTEMS, AND METHODS FOR DETECTING SUBSTANCES

RELATED APPLICATIONS

The present application claims benefit of priority under 35 U.S.C § 119 (e) from U.S. Provisional Application Ser. No. 62/639,708, filed Mar. 7, 2018, entitled "Systems and Methods for Detecting Drugs and Explosives" and U.S. Provisional Application Ser. No. 62/781,044, filed Dec. 18, 2018, entitled "Devices, Systems, and Methods for Detecting Substances"; the disclosures of which are hereby incorporated by reference herein in their entirety.

FIELD OF INVENTION

The present disclosure relates generally to a substance detection device and the operation of said device. More particularly, a device for the detection of explosives and other substances which has on-board reagents and solvents and can accept swabs directly into said device to perform the reaction in the device. This device is useful in a wide array of situations which require testing completely unknown substances and therefore must test for multiple different substances in one test.

BACKGROUND

The detection of illicit drugs and explosives is critical for police and other law enforcement officials. But one of the biggest challenges they face is that testing often must be able to be accomplished by a field-deployable platform. When testing is performed in the field, there is any number of unknown substances which a test substance may be. Because of this it is imperative that an analysis technique is able to test for and detect multiple possible substances in a single test while still offering rapid analysis time.

Options for testing include microfluidic disks and spectroscopy. While spectroscopy has been made portable for field testing, it is considerably more expensive. Additionally, spectroscopy relies on a known collection of spectra to compare the test material against. This collection is based on pure compounds, something that is almost never found in the field, therefore leading to inconclusive testing. The alternative to this is to use microfluidic disks or chips and colorimetric testing.

Microfluidic technologies in the form of micro-total analysis systems [3] (μTAS) or lab-on-a-chip [4] (LOC) devices, offer numerous advantages for field analysis including rapid analysis, cost-effective substrates and instrumentation, small reagent and sample volumes, and simple operating procedures. In fact, the fully-integrated microfluidic devices developed by Le Roux et al. for rapid human identification by short tandem repeat analysis [5] and Chin et al. for HIV detection [6] are examples where microfluidics has revolutionized testing. Over the last decade, exploitation of centrifugal force has resulted in Lab-on-a-CD systems that control fluid flow through rotation speed [7]. The centrifugal microfluidic or 'rotation-driven microfluidic' (RDM) device platform offers a unique advantage due to portability and potential ease of automation. Multiple fluidic processing steps can be automated by controlling a sequential increase in rotation speed, along with direction and duration. Successful adoption of a Lab-on-a-CD device would require cost-effective device fabrication with an inexpensive substrate, a fabrication process ideal for mass production, and capabilities for on-board reagent storage. Wet etching and photolithography fabrication methods require expensive cleanroom facilities to create glass and silicon devices [8]. A new generation of fabrication methods, e.g., soft lithography [9], hot embossing [10] and injection molding [11], provide a path to more cost-effective microdevices [12]. These 'molding' techniques require the tooling of a 'master mold' that is ideal for mass production, but not for the prototyping needed during design and development phases when new chemistries are implemented for new applications. Recently a more simplistic, functional and cost-effective prototyping method has been created—laser Print, Cut and Laminate (PCL) fabrication. The laser PCL protocol offers a means to fabricate sophisticated microfluidic architecture using inexpensive, commercial-off-the-shelf materials (polyester overhead transparencies) and instrumentation (laser printer, plotter cutter, and laminator). This process uses the printer toner as adhesive and the printer as a high precision tool for laying down this 'adhesive' to effectively bond multiple layers. In addition, toner localized in channels/chambers functions as a hydrophobic valves (not adhesive) [13]. The polyester transparencies have a silica surface coating that allows the polyester-toner (PeT) device surfaces to be hydrophilic, thus amenable to capillary action, a mechanism needed for easy filling of structures. Microfluidic structures are 'cut' into the middle device layers (plotter cutter or CO2 laser) and aligned with a custom-built alignment tool. The device is bonded by applying heat and pressure to the layers using an office laminator to produce the final device ready for use.

Currently though, these microfluidic disks or chips are only able to test via pipetting or inserting a substance into an inlet of the microfluidic device. This requires the swabbing of a surface and then extracting the substance off of the swab, only to mix it into a solution and pipet this into the microfluidic device (MFD). This process can introduce errors and can be time consuming and difficult, especially when done in the field. The tester must take painstaking precaution to make sure to extract the illicit substance from the swab before mixing it with the reagent. This slows down the analysis process and leads to great difficulty in being able to utilize these methods in the field.

There is a need for a device which can not only test for multiple substances in a single analysis run, but also a device which can have a swab directly integrated into it to communicate with a solvent capsule. We describe and address the utility of these features in the use with narcotics and explosives detection, but the embodiments described herein can extend to a large range of other colorimetric testing uses. These challenges described above will be overcome by the embodiments described herein.

SUMMARY OF EXEMPLARY EMBODIMENTS OF THE INVENTION

An aspect of an embodiment provides for a microfluidic device (MFD) and more specifically to a microfluidic device (MFD) with multiple reagent chambers that is capable of accepting a swab or interface containing an unknown substance directly into the MFD.

The devices described below provide an improved option for the colorimetric testing of substances in microfluidic devices. An exemplary embodiment of this microfluidic device can comprise: a chip including a substrate forming the chip; a microfluidic channel disposed on the substrate of the chip; a reagent enclosed in a portion of the microfluidic channel; a solvent contained in a capsule on the chip; a chamber to accept a swab; and a swab.

In an aspect of the embodiment, the microfluidic device (MFD) may interface with a manifold at a lower surface of the manifold. In an embodiment, this manifold may have a joining surface that may include a variety of interlocking structures, such as pegs, a tongue or groove structure to fit in a tongue and groove attachment, or a hook or loop surface to create a hook and loop joining means with the MFD.

In an embodiment, the MFD may comprise a joining surface or means to join or interlock with the joining surface or means or interlocking structures of the manifold. The joining surface or means of the MFD may include a variety of interlocking structures that may include openings or recesses to align with pegs, grooves for interaction with a tongue and groove fastener, or a hook or loop surface for combination with the manifold.

In an embodiment, the manifold can be a platform or device that assists in directing, fitting, and/or engaging a swab or interface surface with the MFD such as at desired or required regions of the MFD.

Other embodiments of the MFD may have a mating surface (e.g. adhesive or joining mechanism) surrounding the chamber well. This mating surface (e.g., adhesive or joining means or mechanism) can secure the substrate layer or backing of the swab (or other applicable layer of the swab) to the MFD, holding the swab in place during the testing process.

In an example, a method for identifying a substance can comprise: inserting a swab (or interface surface) into a swab chamber (chamber well) in a MFD device having a reagent disposed in a microfluidic channel connected to a sample channel which may provide a mixing domain; releasing the solvent from its containing capsule; spinning the MFD device to move the solvent to the substance (to be identified or analyzed) and pull the substance off of the swab, wherein the spinning also further moving the substance and the solvent (for example, a mix of the solvent and unknown substance) to the sample channel and then to the detection chamber; capturing a digital image of a reaction between the substance and the reagent; analyzing the digital image of the reaction to determine a color parameter; comparing the color parameter to a reference parameter of a reference composition; and assessing the comparison to determine if the substance is the reference composition or other material.

Multiple digital images of the reaction between the substance and the reagent may be captured over time. A video image may be implemented to observe the ongoing color change or rate of color change.

An aspect of an embodiment of the present invention provides, among other things, a microfluidic device for use with a swab and a solvent for colorimetric detection for substance identification. The microfluidic device may comprise: a microfluidic chip; a solvent capsule disposed on the microfluidic chip configured to contain the solvent; a chamber well configured to receive the swab; a microfluidic channel disposed on the microfluidic chip, and in communication with the solvent capsule and the chamber well; and the solvent capsule is configured to be able to allow the solvent to escape and interact with the swab, intended to be positioned in the chamber well, via the microfluidic channel.

An aspect of an embodiment of the present invention provides, among other things, a method for identifying a substance. The method may comprise: inserting a swab in a microfluidic device having a solvent disposed in a solvent capsule connected to a detection chamber; spinning the microfluidic device to move a mixture of the substance and the solvent to the detection chamber; capturing a digital image of a reaction between the mixture and a reagent; and determining the status of the substance based on the digital image.

An aspect of an embodiment of the present invention provides, among other things, a method for identifying a substance. The method may comprise: inserting a swab in a microfluidic device having a solvent disposed thereon; applying a force to move the substance and the solvent relative to each other to mix the substance and solvent; applying a force to move the mixture and a reagent to mix with one another to provide a reaction; capturing a digital image of the reaction; and determining the status of the substance based on the digital image.

An aspect of an embodiment of the present invention provides, among other things, a microfluidic device for the detection of drugs, explosives, chemical warfare, or other substances which is able to directly accept a swab into the device for testing. This device additionally contains on-board reagents to perform colorimetric testing for threshold determination directly in the device. These features are useful in a wide array of situations, such as at security checkpoints, environmental monitoring, clinical analysis, which require testing completely unknown substances and therefore must test for multiple different substances in one test. This is especially useful for police and other law enforcement officials who often must use field-deployable platforms making accurate field-testing critical for safety.

An aspect of an embodiment of the present invention provides, among other things, a microfluidic device for use with a swab and a solvent for colorimetric detection for substance identification. The microfluidic device may comprise: a microfluidic chip configured to spin; a solvent capsule disposed on the microfluidic chip configured to contain the solvent; a chamber well disposed on the microfluidic chip configured to receive the swab; a microfluidic channel disposed on the microfluidic chip, and in fluidic communication with and between the solvent capsule and the chamber well; the solvent capsule is configured to be able open when forces are applied to the solvent capsule to allow the solvent to escape from the solvent capsule; the microfluidic channel is configured to allow the escaped solvent to travel via the microfluidic channel to interact with the swab, wherein the swab is intended to be positioned in the chamber well and remain separated from the solvent capsule; and wherein the traveling of the escaped solvent to the swab via the microfluidic channel is a result of centrifugal forces exerted on the microfluidic chip as a result of the microfluidic chip spinning.

It should be appreciated that any of the components or modules referred to with regards to any of the present invention embodiments discussed herein, may be integrally or separately formed with one another. Further, redundant functions or structures of the components or modules may be implemented. Moreover, the various components may be communicated locally and/or remotely with any user/clinician/patient or machine/system/computer/processor. A user may include, but not limited thereto, an emergency responder, law enforcement personnel, transportation security administration (TSA) personnel, security personnel, or military personnel. Moreover, the various components may be in communication via wireless and/or hardwire or other desirable and available communication means, systems and hardware. Moreover, various components and modules may be substituted with other modules or components that provide similar functions.

It should be appreciated that any of the components or modules referred to with regards to any of the present invention embodiments discussed herein, may be integrally or separately formed with one another. Further, redundant functions or structures of the components or modules may be implemented. Moreover, the various components may be communicated locally and/or remotely with any user/operator/customer/client/server or machine/system/computer/processor. Moreover, the various components may be in communication via wireless and/or hardwire or other desirable and available communication means, systems and hardware. Moreover, various components and modules may be substituted with other modules or components that provide similar functions.

It should be appreciated that the device and related components discussed herein may take on all shapes along the entire continual geometric spectrum of manipulation of x, y and z planes to provide and meet the anatomical, environmental, and structural demands and operational requirements. Moreover, locations and alignments of the various components may vary as desired or required.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility and materials as it pertains to the components or portions of components of the device, and therefore may be varied and utilized as desired or required.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

It should be appreciated that as discussed herein, a subject may be a human or any animal. It should be appreciated that an animal may be a variety of any applicable type, including, but not limited thereto, mammal, veterinarian animal, livestock animal or pet type animal, etc. As an example, the animal may be a laboratory animal specifically selected to have certain characteristics similar to human (e.g. rat, dog, pig, monkey), etc. It should be appreciated that the subject may be any applicable human patient, for example.

As discussed herein, a "subject" may be any applicable human, animal, or other organism, living or dead, or other biological or molecular structure or chemical environment, and may relate to particular components of the subject, for instance specific tissues or fluids of a subject (e.g., human tissue in a particular area of the body of a living subject), which may be in a particular location of the subject, referred to herein as an "area of interest" or a "region of interest."

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The invention itself, together with further objects and attendant advantages, will best be understood by reference to the following detailed description, taken in conjunction with the accompanying drawings.

These and other objects, along with advantages and features of various aspects of embodiments of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings.

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

DETAILED DESCRIPTION OF EXEMPLARY EMBODIMENTS

Figure 1:
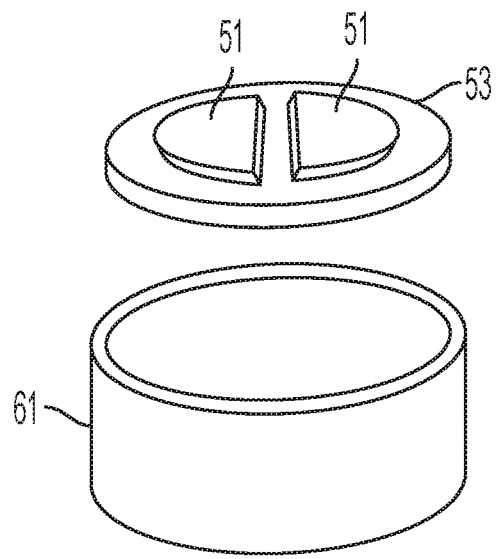
FIG. 1 schematically illustrates a perspective view of an embodiment of the swab and the retainer separated from one another.

Referring to FIG. 1 the swab includes an interface surface 51 which in an embodiment may be attached to a substrate 53 (or backing of the interface surface). This swab may be fit into a retainer 61. The interface surface 51 in this embodiment or any of the embodiments disclosed herein may be made of any suitable material or combination of materials such as paper like gel blot paper, non-paper such as cotton, fiber glass, or any materials now or to be known in the art to be useful for collection of a substance. Additionally, in this embodiment or any of the embodiments disclosed herein, the interface surface 51 may be made of any of the previously mentioned materials with the material coated in a second material useful for collection, such as Teflon. While this coating may not be necessary, in certain embodiments this coating may be desired for different purposes, such as for temperature-resistance. The swab interface surface 51 may have an adhesive surface to allow for attachment to the substrate 53. The substrate 53 may be made of acrylic such as polymethyl methacrylate (PMMA), acrylic glass, plastic, non-plastic, or any other material suitable for holding the interface surface 51 in place during swabbing. This material may be capable of being bent or bending due to the input of a user or in the course of its use. While in an exemplary embodiment of the interface surface 51 is attached to the substrate 53 for rigidity or firmness, in another embodiment the swab may only be comprised of the interface surface 51 and not any substrate 53.

In an exemplary embodiment, the interface surface 51 is comprised of two separated half circles or half ovals. These portions of the interface surface 51 can be separated by any distance, arrangement, or alignment. In another embodiment or any of the embodiments disclosed herein, the interface surface 51 may be one or a plurality of different shaped sections. These may be any shape or contour capable of picking up, absorbing, or collecting some of an unknown substance.

In an embodiment, the retainer 61 may fit around the entirety or a portion of the substrate 53 to hold the swab while a user swabs a surface. In another embodiment, the retainer 61 may fit around the entirety or a portion of the interface surface 51. This may be the case in an embodiment where a swab does not have a substrate but instead is comprised entirely of a swab interface surface 51. The retainer 61 in this embodiment or any of the embodiments disclosed herein may be made of any suitable material or combination of materials such as plastic like ABS filament, injection moldable plastic, thermoplastics, or non-plastic such as stainless steel, tin, acrylic, or PMMA. In an embodiment this material is not capable of being substantially bent by a user, the swab adjusts to fit into the retainer 61. In another embodiment, the material of the retainer 61 is capable of being substantially bent. One reason for this bending may be to bend the retainer 61 to firmly attach, such as by pinching or crimping, to a swab that has been inserted into the retainer 61. In another embodiment, the swab may be adjusted, permanently or temporarily, such as by bending or flexing, to fit into a retainer 61. In this or any of the embodiments disclosed herein the swab may be used with or without a retainer.

Figure 2:
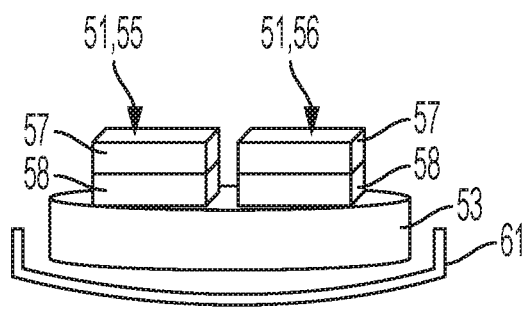
FIG. 2 schematically illustrates a side view of an embodiment of the swab and its component surfaces along with the retainer.

FIG. 2 schematically illustrates a side view of an embodiment of a retainer 61 and the swab with an interface surface 51 attached to a substrate 53. In the exemplary embodiment illustrated in FIG. 2 each interface surface 51 is comprised of a first layer 57 and a second layer 58. In this and other embodiments disclosed herein the interface surface 51 may be comprised of one or a plurality of surfaces. The first layer 57 may be made of aqueous or organic material used for collecting or picking up a substance. The second layer may be made of any suitable material, aqueous, organic, non-organic, or any other material suitable as a backing to the first layer 57. Additional layers may be used in other embodiments with these layers comprised of any of the aforementioned layer materials or any material or combination of materials now or to be known in the art to be useful for the backing of the first layer 57.

In an embodiment, the retainer 61 may retain the swab via pressure on the sides of the swab. In another embodiment, the retainer 61 may retain the swab by the use of an adhesive material to attach the swab to the retainer or by the use of other joining means or joining surface located on the retainer or on the swab.

Referring again to FIG. 2, the interface surface 51 may comprise a left side 55 and a right side 56. In another embodiment there may be any number of different sections of the interface surface 51. These sections may of interface surface 51 may be any variety of shapes or contours.

Figure 3:
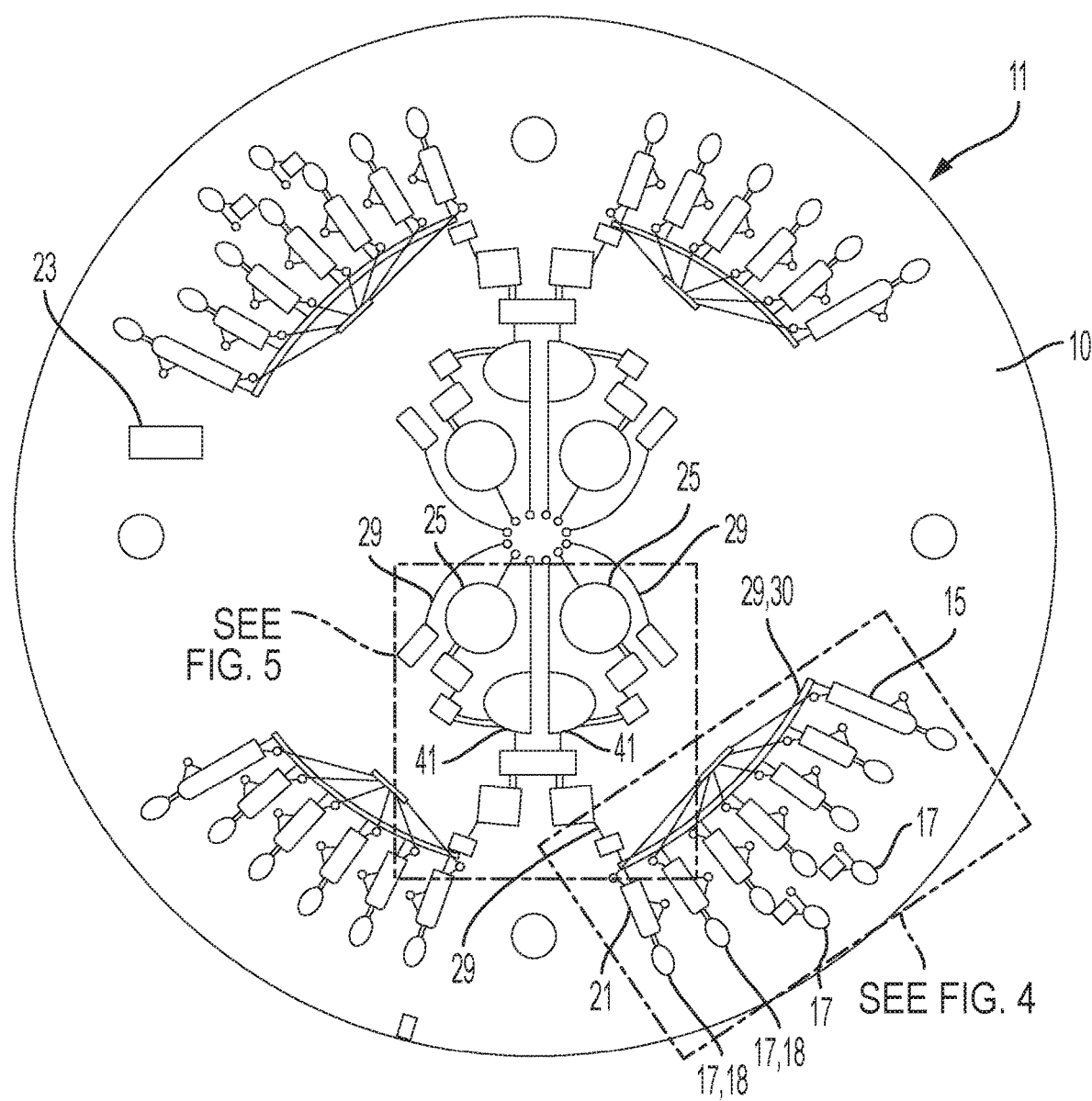
FIG. 3 is a top view of an example of a microfluidic device for threshold determination and drug detection of the present application.
Figure 4:
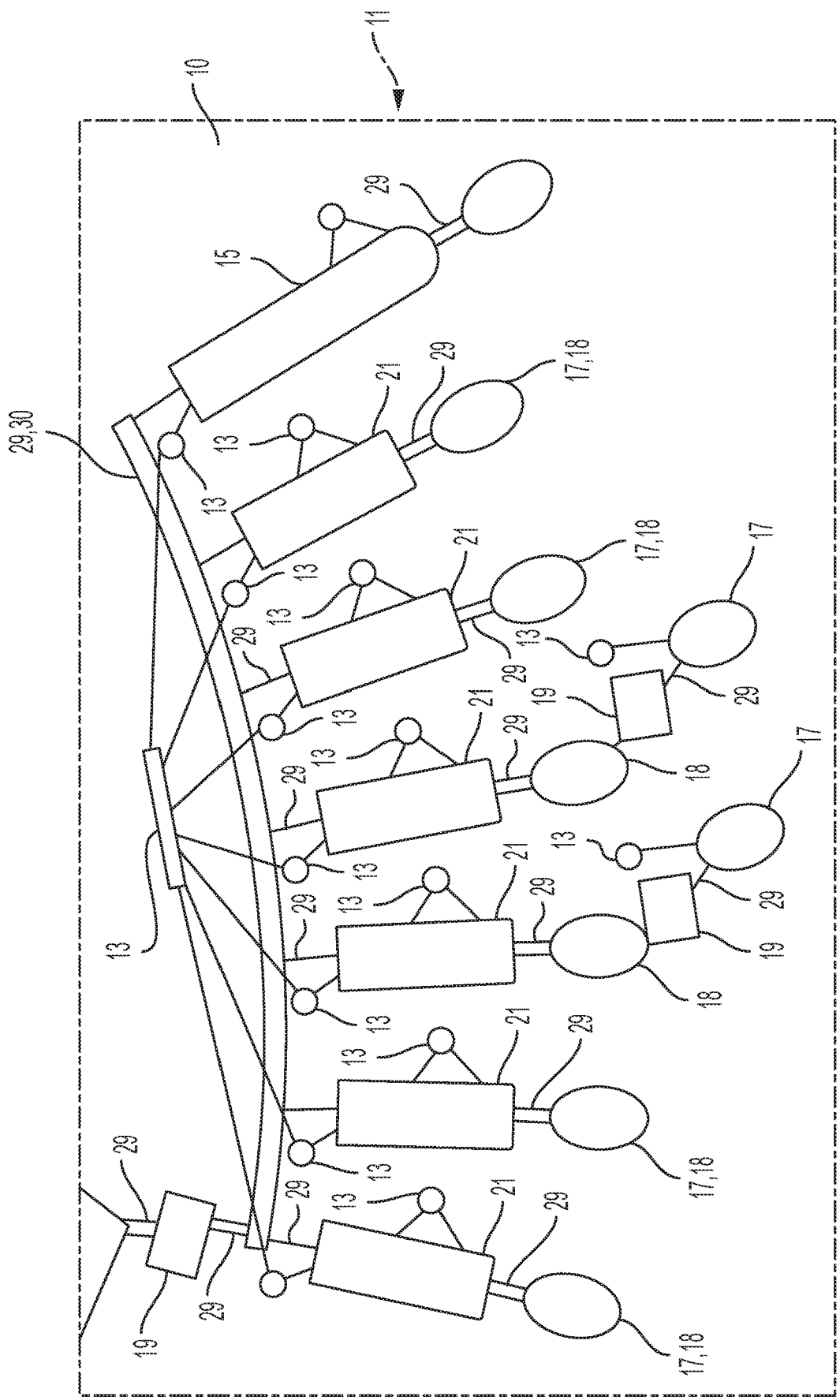
FIG. 4 is a close-up view of a microfluidic device channel architecture from a portion of the microfluidic device of FIG. 3.
Figure 5:
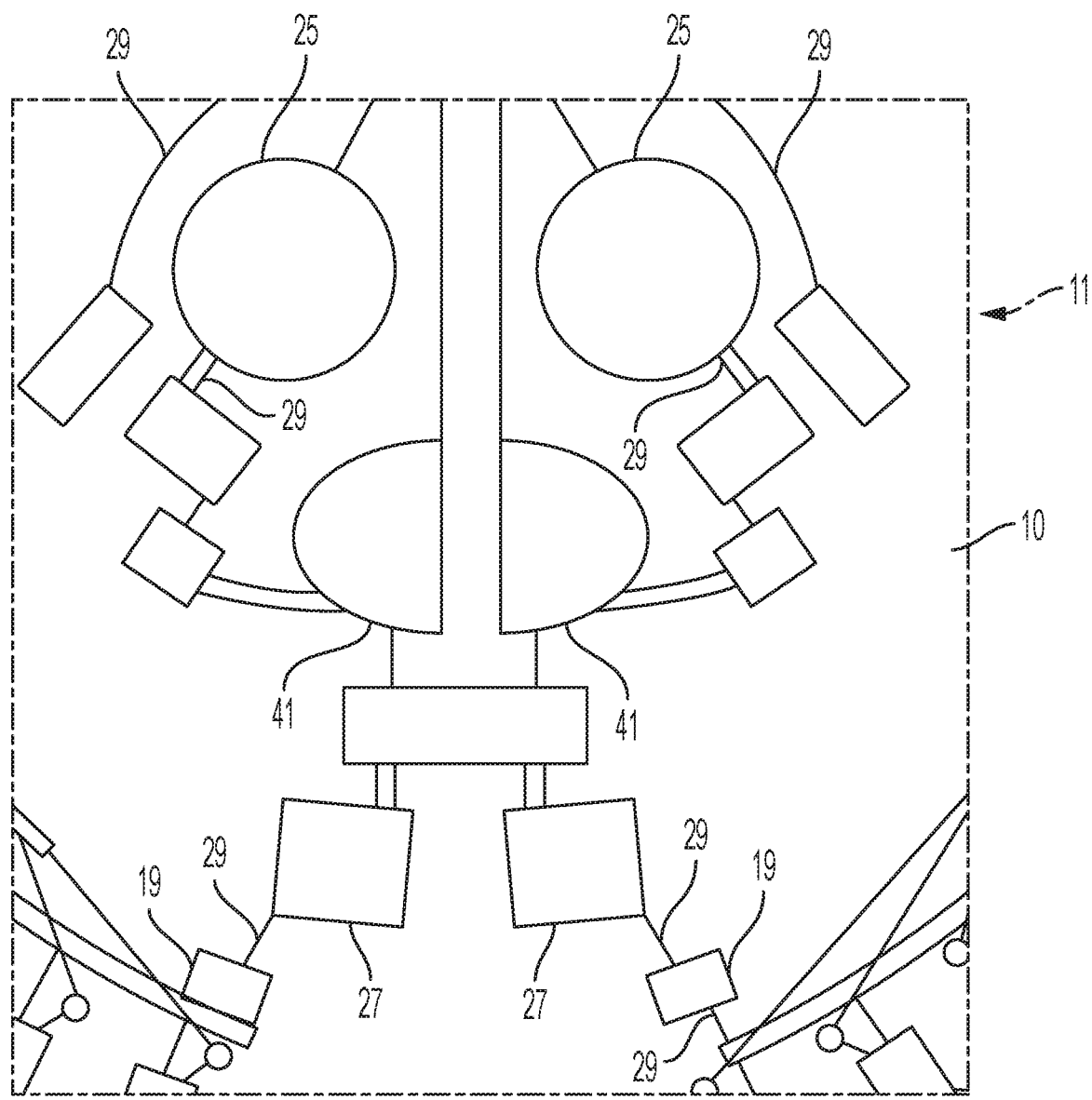
FIG. 5 is a close-up view of a microfluidic device channel architecture and solvent capsule from a portion of the microfluidic device of FIG. 3.
Figure 6:
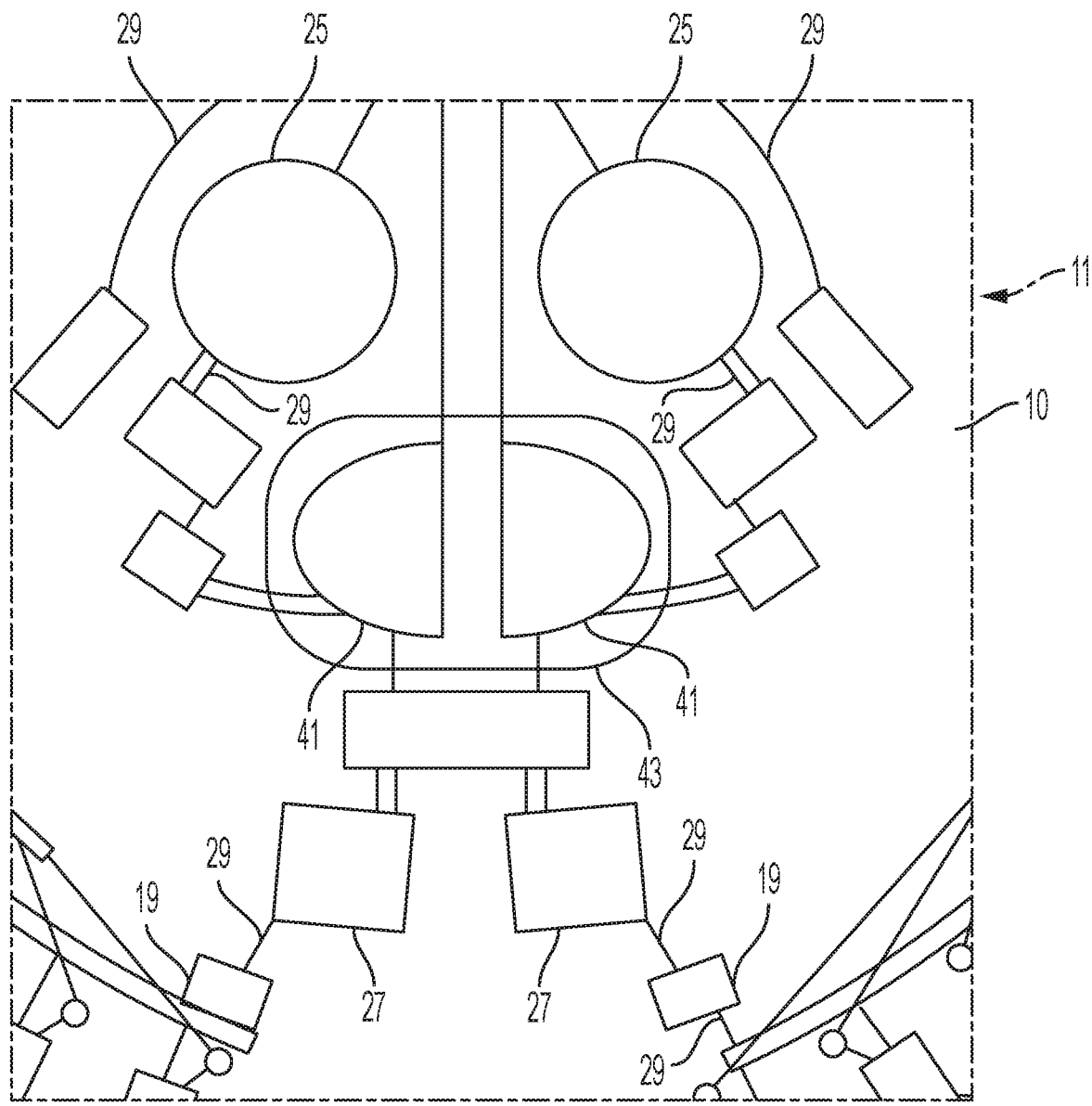
FIG. 6 is another close-up view of a microfluidic device channel architecture and solvent capsule from a portion of the microfluidic device of FIG. 3 which schematically illustrates another embodiment of the microfluidic device.

FIG. 3 shows an exemplary embodiment of a design of a microfluidic device 11 for analyzing, detecting, or the like, such as via threshold determination, of drugs, explosives, and other substances with FIG. 4, FIG. 5, and FIG. 6 describing each feature of the design. FIG. 3 is a top view of an exemplary microfluidic device 11 having a plurality of microfluidic channels 29 on the chip 10 for threshold determination and drug detection and integrated solvent capsules 25. A microfluidic channel 29 may be any passage or pathway via which the solution or reagent is able to travel by applied force. In an embodiment, the reagent may be exposed to different forms of force to induce traveling, such as mechanical, gravitational, centrifugal, heat energy, gas expansion, or laser or mechanical puncture. The microfluidic channels 29 may be printed, cut, ablated, etched, or otherwise formed in or on the microfluidic chip 10. In other embodiments, the microfluidic device 11 may have any combination of number of microfluidic channels 29 and solvent capsules 25. The solvent capsules 25 may be variety of structures or regions, such as a container, repository, receptacle, or holder. The solvent capsules 25 may be separate from the fabricated microfluidic chip 10 or may be a designated area of the microfluidic channel 29 that may provide a source of the solvent. The solvent may be released from the solvent capsule 25 in order to interact with the swab and extract the substance from the interface surface 51. In even other embodiments, a solvent capsule 25 may not be utilized and the solvent may be introduced via pipet, included during the fabrication of the device, or other means known or to be known in the art. Once the solvent and the substance have interacted and mixed, due to the spinning of the microfluidic device 11, the sample solution flows through the microfluidic channels 29. In other embodiments, spinning or centrifugal mixing, may not be utilized and the sample solution may travel through the microfluidic channels 29 by other forms of mixing such as passive mixing, active mixing, or another type of mixing now or to be known in the art. It should be appreciated that while in an exemplary embodiment the fluidic movement through the microfluidic channels 29 is in an outward direction from the center, in other embodiments the microfluidic channels 29 and other architecture of the microfluidic device 11 may allow for the fluidic movement to be in any direction. This may be utilized in an embodiment where a smaller footprint of the microfluidic device 11 is desired.

Referring again to FIG. 3, in this or any embodiment described herein, the microfluidic device 11 may include a tracking feature 23. This tracking feature 23 may be a barcode, RFID chip, or any other feature known or to be known in the art for accounting, keeping inventory, or tracking. This tracking feature may be attached onto the microfluidic device, such as by the attachment of a barcode indicia or an RFID chip, or may be integrated into the microfluidic chip 10, such as by the printing of a barcode or numerical identifier directly onto the microfluidic chip 10.

FIG. 4 shows a close-up view of a microfluidic channel 29 on the chip 10 of a portion of the microfluidic device 11 of FIG. 3. As seen in the top left of FIG. 4, the microfluidic device 11 may incorporate a laser valve 19 to control fluidic movement. In other embodiments this may be another type of passive valve, active valve, or mechanical valve known now or to be known in the art. Additionally, in even other embodiments this laser valve 19 may be removed and instead be an open channel with no valve, allowing the sample to freely flow to the sample channel 21. The laser valve 19 may be used alone or in combination with any of the features described in any of the embodiments disclosed herein.

Once the sample solution (for example, a mix of the solvent and unknown substance) enters an outer microfluidic channel 30, which is a type or example of a microfluidic channel 29, the solution enters the sample channels 21. The microfluidic device 11 may be spun to ensure the sample channels 21 are completely filled. Excess solution is able to move further outward to fill a waste chamber 15. The waste chamber 15 may also indicate whether the test was successfully run (e.g., viable or current) or if a test was a bad test (e.g., faulty or expired). It may do this by having an indicator, such as dye, which will indicate to the user that sample solution was able to flow all the way through to the waste chamber, making for a successfully completed test. For example, instead of only showing a reaction if a substance is detected in the sample solution, the indicator will signal to the user whether sample solution was able to reach the waste chamber, regardless of whether there was a substance detected in the solution. This removes confusion between a negative test and a non-test for a user.

The microfluidic device 11 continues to be spun forcing the sample into a reagent chamber 17. In the reagent chamber 17 the solution reacts with a reagent. In an embodiment this reagent may be any combination of reagents such as tetramethylammonium hydroxide, p-dimethylaminocinnamaldehyde, ammonium titanyl oxalate, methylene blue, Nessler's reagent, Griess reagents, cobalt(II) thiocyanate, Simon's reagents, tetrabromophenol blue, or bromocresol green. In other embodiments the reagents may be any combination of reagents known or to be known in the art. Generally, a wide variety of reagents could be stored or provided in the reagent chamber 17 for the detection of, for example, explosives, narcotics, chemical warfare agents, environmental monitoring, clinical analysis, or other desired activities. These reagents may be stored as liquids, by being printed on polyester film, pipetted onto a film like substance such as that made of polyester, dry storage via printing, or any other technique known or to be known in the art.

The microfluidic device may also include a detection chamber 18. In some embodiments the reagent chamber 17 may be the same chamber as the detection chamber 18 allowing the colorimetric reactions to take place in the same location as the detection system scans to analyze (such as detection systems 120, 220 as shown in FIGS. 14-16). In another embodiment, the reagent chamber 17 may be in a different location than the detection chamber 18. When these chambers are separated they may be connected by microfluidic channels 29. These channels can contain different valves to allow for a user to control when the reagent is able to mix with the sample solution (for example, a mix of the solvent and unknown substance). One such approach is to utilize a siphon valve. Another embodiment may contain a valve which can be opened via use of a laser. The laser valve 19 may be a polyester material or other material or structure known or to be known in the art for use as a valve. In other embodiments, this laser valve 19 may be another type of passive valve, active valve, or mechanical valve known now or to be known in the art In an embodiment, the reagent or reagents may be stored in the reagent chamber 17 and/or sample channel 21.

Embodiments of the devices described herein, e.g., the microfluidic device 11 and its component parts, currently utilize polyester. Other potential materials for the microfluidic device 11 and its component parts such as the various valves and channels might include: heat sensitive adhesive, pressure sensitive adhesive, PMMA, or hydrophobic membranes. Polyester-toner refers to toner-coated polyester that serves as an adherent material, or area-specific toner printed for alignment, or for valving, as a hydrophobic valve or for a laser valve. Toner can be replaced by black polyester or using other substrates mentioned above. Additionally, the channels and chambers can be of varying thicknesses in different embodiments. In an exemplary embodiment, the microfluidic channels 29 are one laser-ablated layer and the sample channels are three laser-ablated layers.

FIG. 4 also shows an embodiment which may utilize air vents 13 connected to the microfluidic channels 29. These air vents 13 may be included in an embodiment to assist in the transportation through the channels and the mixing of the sample. One or more air vents may be included on the microfluidic device 11 to help ensure accurate testing and to generally assist in fluidic control. Air vents and other fluidic controls help proper transportation and mixing of the solution by preventing air pockets and other disturbances, even as the solution travels through channels and chambers of varying sizes. Additionally, in this or any of the embodiments disclosed herein, a membrane or membrane like substance or material may be placed over the outlets of the air vents 13 to ensure the microfluidic device 11 is fully-enclosed and to prevent the escape of any sample solution or reagents.

FIG. 5 is a close-up view of a portion of the microfluidic device 11 of FIG. 3 showing the device channel architecture and the solvent capsules 25 on the chip 10. These solvent capsules 25 may be similar to blister packs for example. In an embodiment, these solvent capsules 25 may contain any combination of solvents such as acetonitrile, ethanol, methanol, water, organic based solvents, or other aqueous or non-aqueous solvents. In an embodiment, the solvents may include inorganics, buffers, acids and bases (possibly diluted). In other embodiments the solvent capsules 25 may contain various solvents known or to be known in the art for use in colorimetric testing. Each solvent capsule 25 may contain one or any combination of these various solvents. These solvent capsules 25 may be made of polyester, similar to the rest of the microfluidic device 11. In other embodiments, these capsules may be made of any combination of various plastic or non-plastic materials, or structures. Additionally, in an embodiment, there may be one or a plurality of solvent capsules 25. These one or more capsules may be capable of releasing their solvent into one or more different microfluidic channels 29. These solvent capsules may release their contained solvent when exposed to some form of force. In an embodiment, these solvent capsules are capable of being caused to release their solvent by a mechanical force such as a user exerting force on said capsule. In another embodiment these solvent capsules are designed to release the solvent contained therein when exposed to a different form of force, such as mechanical, gravitational, centrifugal, heat energy, gas expansion, or laser or mechanical puncture. The release of this solvent (not shown) from the solvent capsule 25 flows to the chamber well 41 which is located on the microfluidic chip 10. This chamber well 41 is an opening designed so as to allow a user to insert the swab's interface surface 51 (not shown in FIG. 5) into the chamber well 41 so that the aforementioned solvent may interact with the interface surface 51 and the substance attached to the interface surface 51. This allows the solvent to extract some of the substance from the interface surface 51 and carry it through the microfluidic channels. In an embodiment, the microfluidic channels are capable of carrying the solvent and substance solution to different clusters of reagent chambers 17 or detection chambers 18 (as shown with a cluster in each region or quadrant of the device in FIG. 3). While FIG. 3 shows four separate clusters of reagent chambers 17 and detection chambers 18 on the microfluidic device 11, the microfluidic device may contain any number of these clusters. Additionally these clusters may be located in different regions on the microfluidic disk 11. This means that the microfluidic channels may be arranged so that different series of tests may be performed for different portions of the interface surface 51 based upon it being inserted into a different chamber well 41. This is important as when you are attempting to identify a substance so as to be able to run multiple series of tests with the multiple sets of detection chambers 18 using a single solution or using multiple solvent capsules 25. Additionally, in this or any of the embodiments disclosed herein, the microfluidic device 11 may accept a single swab or in other embodiments may be capable of accepting multiple swabs.

The geometry of the chamber well 41 may vary and can be any shape capable of accepting the interface surface 51 into the chamber well 41. In an exemplary embodiment there are two substantially half circle shaped (or half oval shaped) chamber wells 41 which substantially match the size and shape of the interface surface 51 of the swab.

In an embodiment, this chip 10 can be made of polyester or other materials known or to be known to be capable of forming a microfluidic device 11 for colorimetric testing.

In an embodiment, the microfluidic device 11 may contain a sample prep chamber 27. This sample prep chamber 27 may allow for the filtering out of contaminants or unwanted particles from the sample solution, such as contaminants that were picked up by the swab during sample collection. It may achieve this filtering by various means such as small diameter laser valve holes to filter out larger particles, centrifugal sediment filtration, or any other filtering means known or to be known in the art. Once the solution passes into the sample prep chamber 27 and filtration is taking place, the device architecture allows for the clean sample to be siphoned from the top of the sample prep chamber 27 for downstream analysis, leaving behind a layer of sediment contaminant at the bottom of the sample prep chamber 27.

FIG. 6 is another close-up view of a chip 10 having the channel architecture and solvent capsules 25 from a portion of the microfluidic device 11 of FIG. 3 which schematically illustrates another embodiment of the microfluidic device 11. This embodiment of the microfluidic device 11 may contain a mating surface 43 which can fully or partially surround the chamber wells 41. Glue, paste, other materials such as hook and loop fasters or interlocking ridges that are capable of restraining, and the like may be used as adhesive materials for the mating surface 43. This mating surface 43 may be capable of joining the swab (not shown in FIG. 6) to the microfluidic device 11. In an exemplary embodiment, the mating surface 43 attaches to the substrate 53 of the swab, holding the swab in place with the interface surface 51 inserted into the chamber well 41, for the duration of the detection, identification, and analysis process. This feature of the mating surface 43 may be used alone or in combination with any of the features described in any of the embodiments disclosed herein.

Figure 7A:
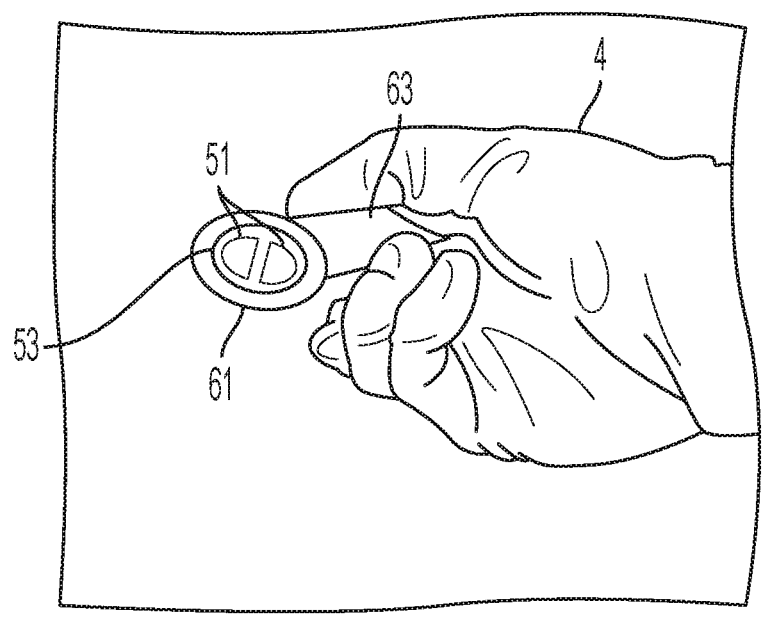
FIG. 7A is a schematic illustration of a user holding a handle with a retainer and swab attached.

FIG. 7A is a schematic illustration of a user 4 holding a handle 63 with a retainer 61 which has a swab having substrate 53 and interface surfaces 51 attached. To integrate sampling into the microfluidic device, manual application of the swab to the microfluidic device 11 shall be needed so as to be capable of straightforward operation for decreased user error. As such, in some embodiments a handle 63 with a retainer 61 may be utilized. Utilizing a handle 63 makes for easier swabbing of an environment surface. The handle 64 in this or any of the embodiments disclosed herein may be made of any suitable material or combination of materials such as plastic like ABS filament, injection moldable plastic, thermoplastics, or non-plastic such as stainless steel, tin, acrylic, or PMMA. The swab is held by retainer 61 via the use of any of the previously mentioned joining means or by a pressure-fit seal.

Figure 7B:
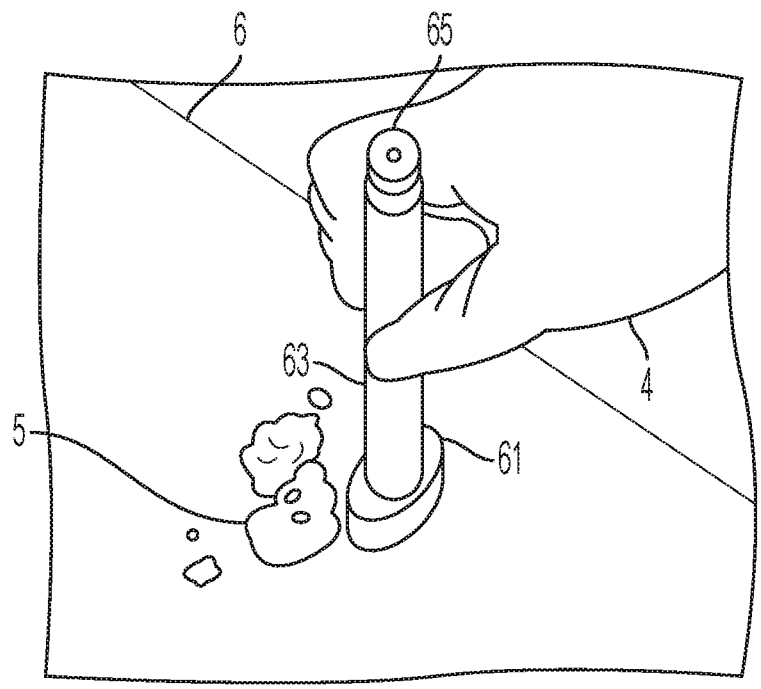
FIG. 7B is a schematic illustration of a user using the handle to wipe the swab over an environment surface to pick up, absorb, or collect some of the unknown substance.

FIG. 7B is a schematic illustration of a user 4 using the handle 63 to wipe the swab, which is held in place by a retainer 61, over an environment surface 6, such as an object's or subject's surface, to pick up, absorb, or collect some of the unknown substance 5. In this embodiment, the handle 63 additionally has an ejector 65. This ejector 65 may be utilized in embodiments to assist in the ejecting of the swab from the retainer 61. It may accomplish this by a spring loaded plunger which is capable of pushing or advancing the swab out of the retainer by force, either direct contact or any other suitable force such as air pressure. The ejector 65 in this or any of the embodiments disclosed herein may be made of any suitable material or combination of materials such as plastic like ABS filament, injection moldable plastic, thermoplastics, or non-plastic such as stainless steel, tin, acrylic, or PMMA. In this or any of the other embodiments disclosed herein, the handle 63 may or may not have an ejector 65 attached. Additionally, in this or any of the embodiments disclosed herein, the combination of the swab and the handle 63 may be designed to be single use or the handle 63 may be designed to be reusable.

Figure 7C:
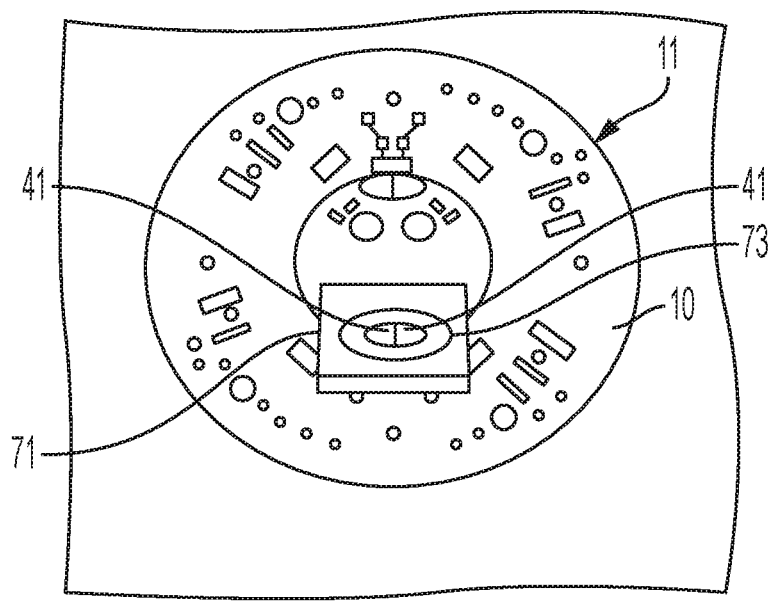
FIG. 7C schematically illustrates a perspective view of the microfluidic device with a manifold attached or positioned.

FIG. 7C schematically illustrates a perspective view of an exemplary embodiment of the microfluidic device 11 with a manifold 71 attached or positioned. The manifold 71 may have a complimentary geometry to the surface of the microfluidic device 11 for correct alignment of the manifold to the device 11. This ensures that the aperture 73, which is an opening, of the manifold 71 is positioned over the chamber wells 41. In an exemplary embodiment, the aperture 73 of the manifold 71 has a complimentary geometry to the swab so as to position the swab for correct insertion of the interface surface 51 into the chamber well 41. This may also be achieved by the aperture 73 having a complimentary geometry to the retainer 61 so that correct alignment of the retainer is accomplished. For example, this can ensure that the swab or the retainer 61 can only rotate 180 degrees to fit within the adapter, and either orientation will allow for correct insertion of the swab. In an embodiment which has a handle 63 that has an ejector 65 attached, the ejector may be utilized to eject the swab once correct aligned and insertion is achieved.

Figure 7D:
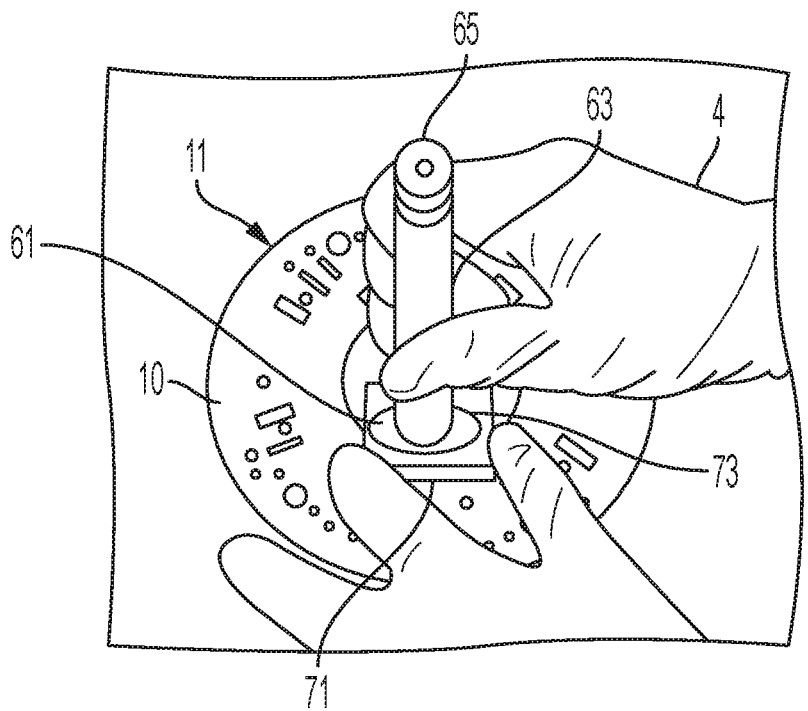
FIG. 7D is a schematic illustration of a user inserting the swab into the microfluidic device via use of the manifold engaging the retainer.

FIG. 7D is a schematic illustration of a user 4 inserting the swab into the microfluidic device 11 via use of the manifold 71 engaging the retainer 61. As previously mentioned, the manifold 71 may be attached to the microfluidic device 11 to ensure proper alignment and insertion of the interface surface 51 (not shown) of the swab into the chamber wells 41 via use of the aperture 73.

Figure 7E:
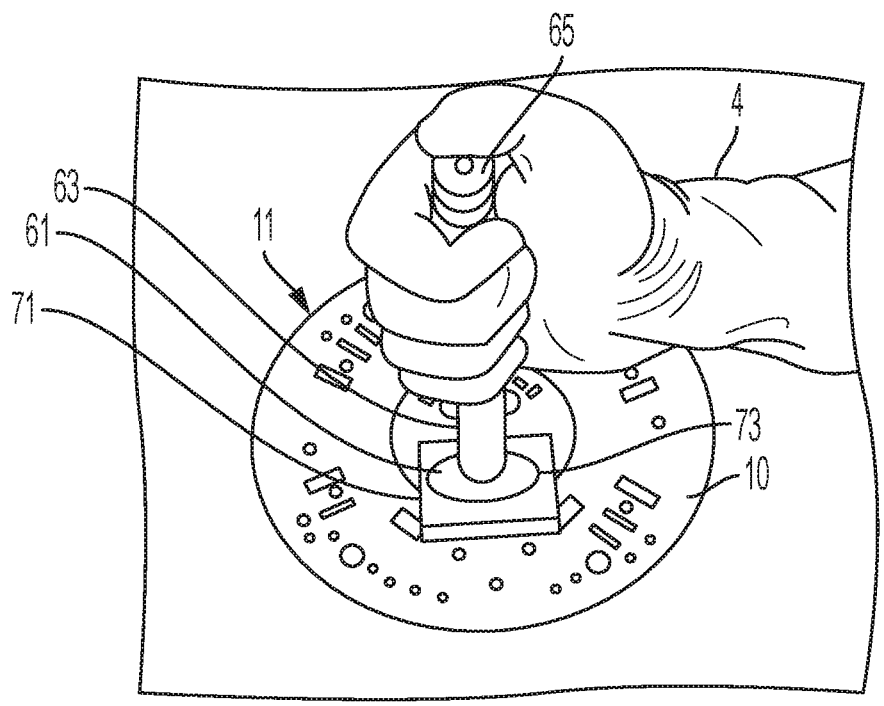
FIG. 7E schematically illustrates a user ejecting or deploying the swab from the retainer into microfluidic device (MFD), such as at a swab chamber (chamber well) or other designated region.

FIG. 7E schematically illustrates a user 4 ejecting or deploying the interface surface 51 (not shown) of the swab from the retainer 61, via use of the ejector 65, into microfluidic device 11, such as at a swab chamber (chamber well) 41 or other designated region. In this embodiment, this is accomplished through the alignment of the retainer 61 with the aperture 73 of the manifold 71. As previously discussed, once properly aligned, the user may press the ejector 65 of the handle 63 to cause the release of the interface surface 51 (not shown) of the swab from the retainer 61.

Figure 7F:
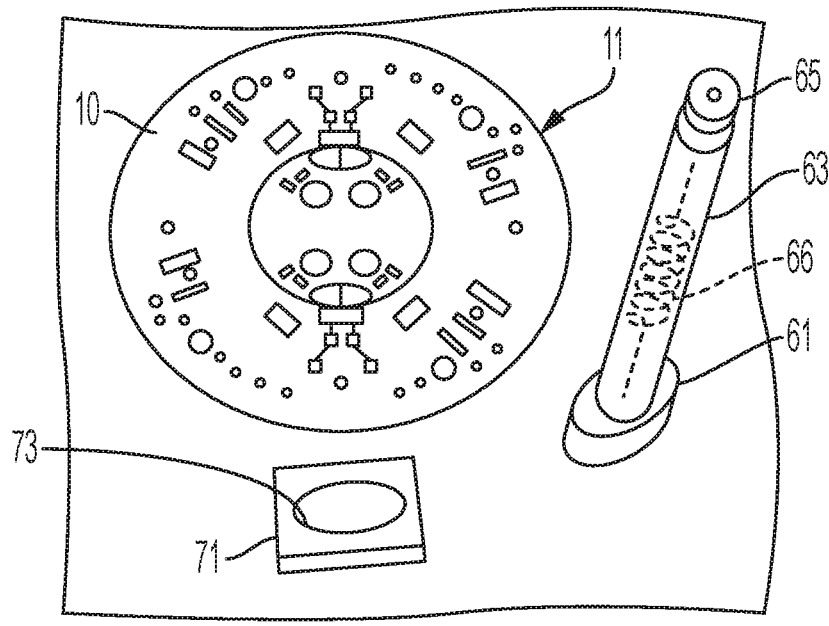
FIG. 7F schematically illustrates a perspective view of a microfluidic device (MFD) which has had the manifold subsequently removed and is ready to test in the system.

FIG. 7F schematically illustrates a perspective view of a microfluidic device 11 which has had the manifold 71 subsequently removed from the microfluidic device 11 and the device is ready to test in the system. As previously discussed, the handle 63 may have an ejector 65 which may be capable of causing the release of the swab from the retainer 61. It may accomplish the release of the swab through the use of a spring 66 or other similar ejecting or advancing means, mechanisms, or structures which is capable of pushing or advancing the swab out of the retainer by force, either direct contact or any other suitable force such as air pressure. This spring may be made of metal like steel, stainless steel, titanium, copper, tin, or nickel or non-metal such as rubber, plastic, injection moldable plastic, other polymers, and the like.

Figure 8A:
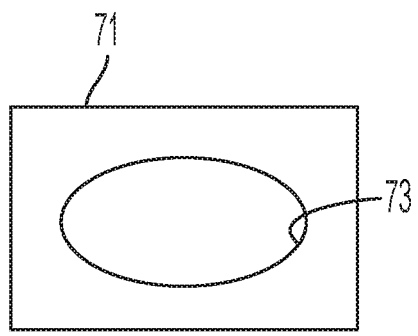
FIG. 8A schematically illustrates a top view of the manifold.

FIG. 8A schematically illustrates a top view of an embodiment of a manifold 71 having an opening or aperture 73.

Figure 8B:
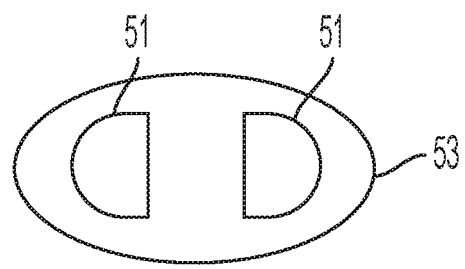
FIG. 8B schematically illustrates a top view of the swab having a substrate.

FIG. 8B schematically illustrates a top view of an embodiment of a swab having a substrate layer 53 and two interface surface 51 sections.

Figure 8C:
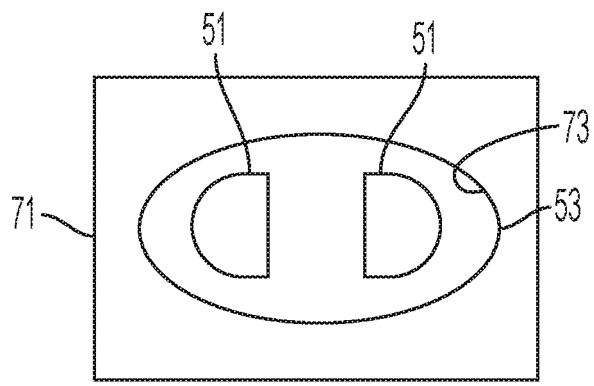
FIG. 8C schematically illustrates a top view of the swab having been inserted into the aperture of the manifold.

FIG. 8C schematically illustrates a top view of an embodiment in which the geometry of the swab is such that the substrate layer 53 is shaped substantially identically to that of the aperture 53 of the manifold 71. The swab has then been inserted or positioned into the aperture 73 of the manifold 71.

Figure 9A:
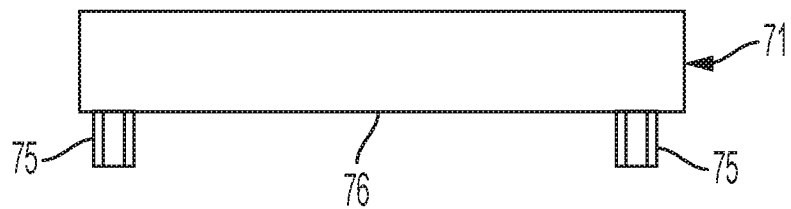
FIG. 9A schematically illustrates a side view of the manifold showing manifold interlock structures, such as interlock pegs.

FIG. 9A schematically illustrates a side view of an embodiment of the manifold 71 showing manifold interlock structures 75, such as interlock pegs. These interlock structures 75 of the manifold 71 may comprise any combination of a variety of different structures such as tongue or groove structure to fit into complimentary geometry on the microfluidic device 11, hook and loop surface to also attach to a complimentary surface on the microfluidic device 11, or an adhesive applied to the surface of the manifold 71, to the microfluidic device 11, or to both surfaces. In an embodiment the manifold may have any number of interlock structures 75 to assist in the proper placement and stabilization of the manifold 71 on the microfluidic device 11.

Figure 9B:
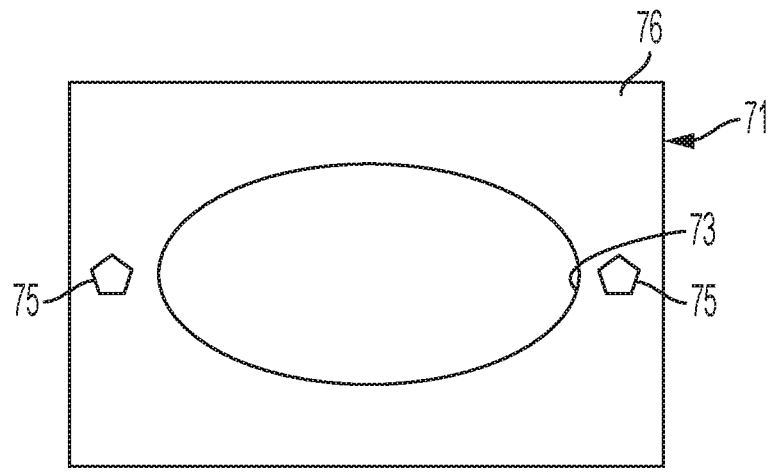
FIG. 9B schematically illustrates a bottom view of the manifold showing manifold interlock pegs of FIG. 9A.

FIG. 9B schematically illustrates a bottom view of an embodiment of the manifold 71, having a lower surface 76, showing interlock pegs as the manifold interlock structures 75 of FIG. 9A. In an embodiment, these interlock pegs may have complimentary holes or recesses on the microfluidic device 11. These pegs or other interlock structures 75 may be made of the same material that comprises the manifold 71 or any other of the previously mentioned materials which the manifold 71 may be comprised of.

Figure 9C:
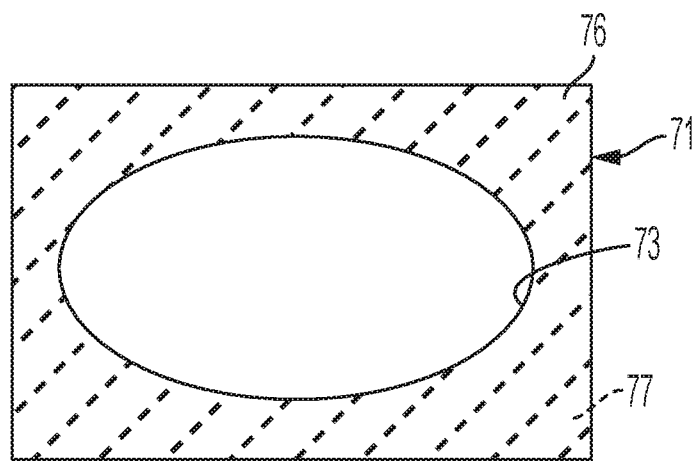
FIG. 9C schematically illustrates a bottom view of the manifold showing the applicable manifold joining surface.

FIG. 9C schematically illustrates a bottom view of another embodiment of the manifold 71 showing the applicable manifold joining surface 77. As opposed to the pegs shown as an example of interlock structures 75 in FIG. 9B, FIG. 9C shows that in another embodiment the joining surface 77 may be any surface which is capable of attaching the manifold 71 to the microfluidic device 11. Joining surface 77 may be any of a variety of interlocking structures, surfaces, contours, or means that may include pegs or the openings or recesses to align with pegs, tongues or grooves for interaction with a tongue and groove fastener, hook or loop surface, or an adhesive like glue, paste, or other materials. In different embodiments, the joining surface 77 may utilize any of the means known or to be known in the art for joining the manifold 71 with the microfluidic device 11.

Figure 10:
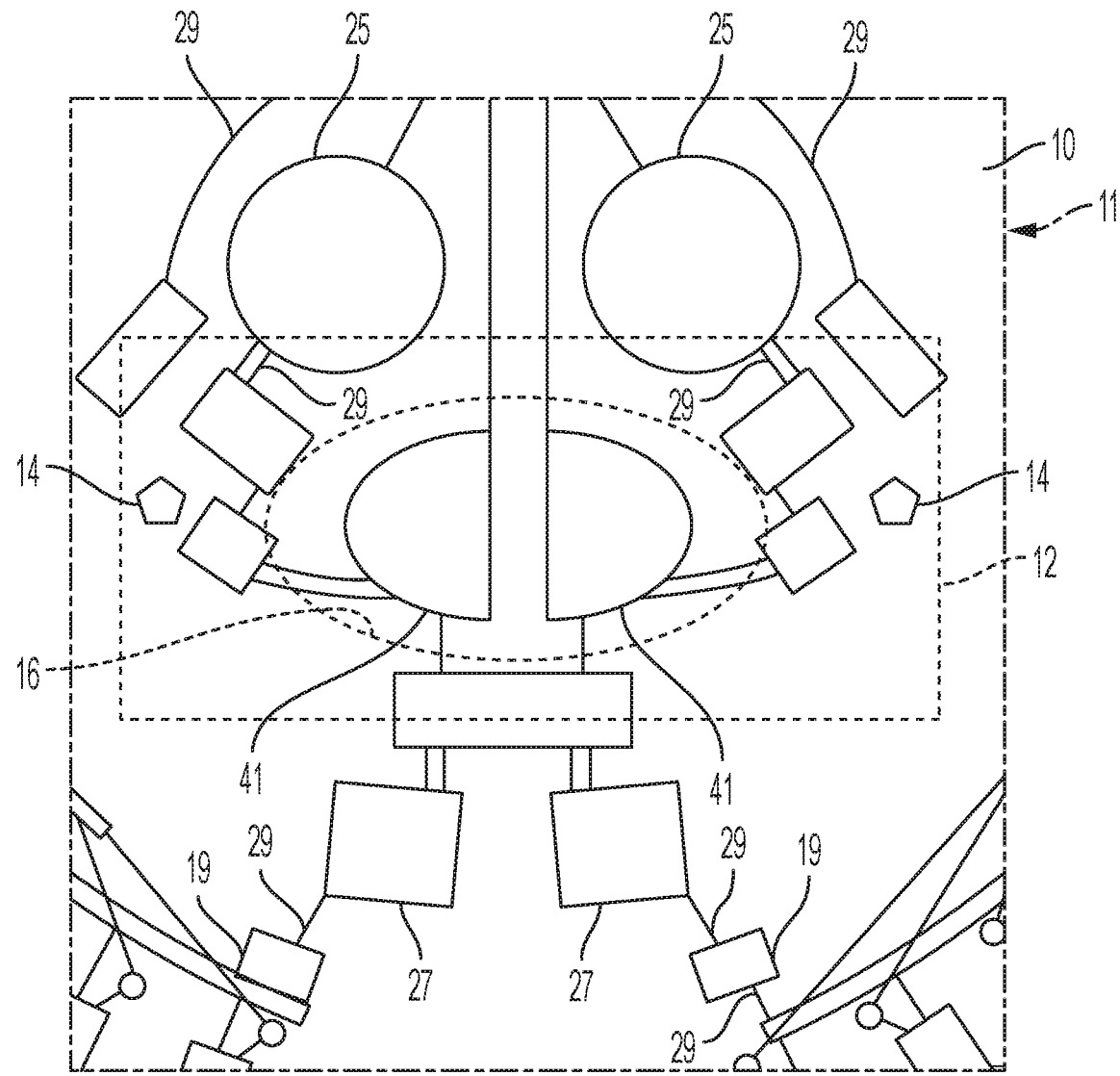
FIG. 10 is a close-up view of a portion of the microfluidic device of FIG. 3 showing the interlock or joining surface 12 containing two interlock members shown as peg holes 14.

FIG. 10 is a close-up view of an embodiment of a portion of the microfluidic device 11 with an interlock or joining surface 12 located on the chip 10, containing two interlock members shown as peg holes 14. Peg holes 14 are an example of an embodiment of the joining surface 12 on the chip 10. There may be any number of peg holes of any shape or recesses which are complementary to the shape of the manifold interlock structure 75 or manifold joining surface 77. In other embodiments, the peg holes 14 may be replaced by a structure located on the chip 10 of complementary design to the manifold interlock structures 75 or manifold joining surface 77 of the manifold 71. The chip 10 having a complementary geography or topography to the manifold 71 and the manifold interlock structures 75 ensures proper alignment during placement of the manifold on the microfluidic device 11. This then ensures proper alignment for the insertion of the swab into the chamber wells 41. FIG. 10, illustrates an embodiment wherein two chamber wells 41 are provided whereby each can accommodate an interface surface 51. One, two or more chamber wells 41 may be implemented having a variety of shapes and positions relative to one another (as well as various locations on the microfluidic device 11).

Still referring to FIG. 10, the interlock or joining surface 12 located on the chip 10, may vary in surface area and shape. The interlock or joining surface 12 may or may not have an area surface and shape that is generally complementary to the area surface and shape of the manifold joining surface 77 of the manifold 71. The interlock or joining surface 12 may only include portions or segments that fall within the area surface and shape of the manifold joining surface 77.

Still referring to FIG. 10, the inward portion of the interlock or joining surface 12 is called out as reference number 16, which may represent a variety of locations and shapes. For example, the inward portion 16 may be extended inward to and around the swab chambers (chamber wells) 41. For example, the inward portion 16 may be extended inward so as to be in alignment with the aperture 73 of a manifold 71 to be placed on the microfluidic device 11. For example, the inward portion 16 may be extended outward toward the perimeter of the interlock or joining surface 12, in any shape or location. Moreover, the inward portion 16 may be extended outward toward the perimeter of the interlock or joining surface 12, in such a way that it may represent a band or segments of a band along the perimeter of the interlock or joining surface 12.

Figure 11:
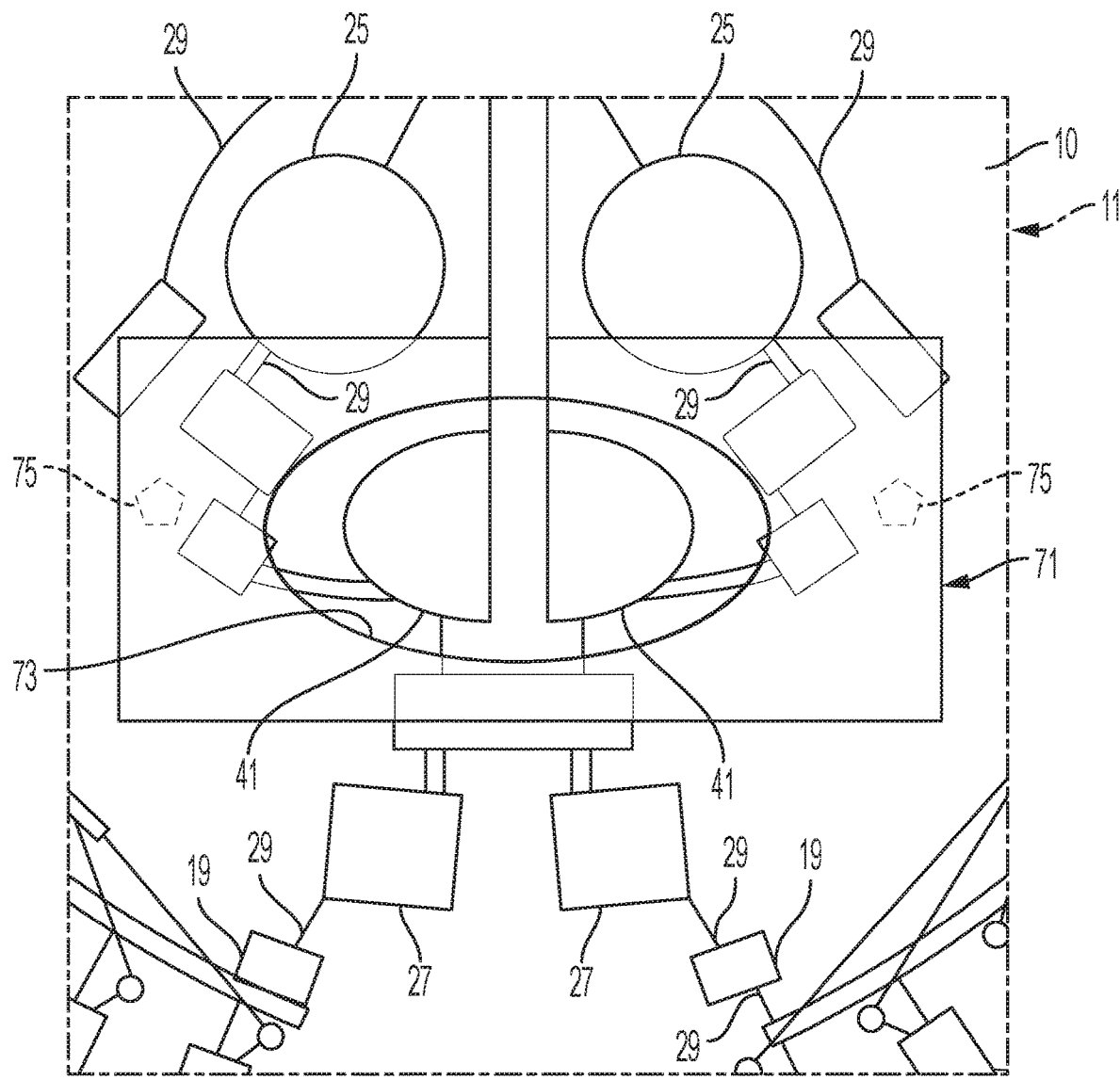
FIG. 11 is a close-up view of a portion of the microfluidic device of FIG. 3 with a manifold attached.

FIG. 11 is a close-up view of an embodiment of a portion of the microfluidic device 11 with manifold 71 attached to chip 10. FIG. 11 shows a possible embodiment of the design of the manifold 71 that can be attached or joined to the chip 10. The manifold interlock structures 75, depicted as pentagonal pegs in FIG. 11, fit into the chip interlock member 14, shown on FIG. 10.

Figure 12:
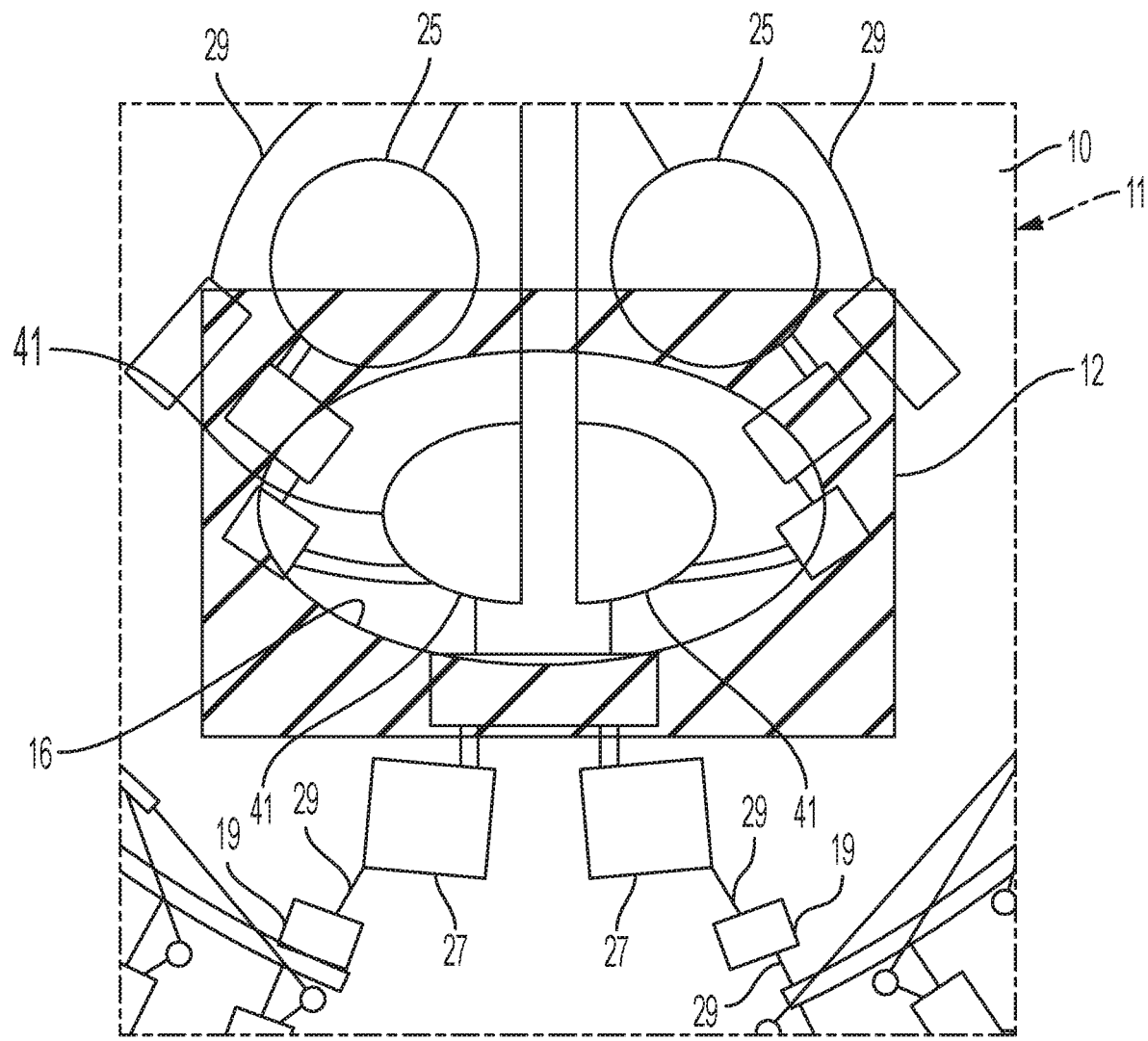
FIG. 12 is a close-up view of a portion of the microfluidic device of FIG. 3 with demarcations indicating the interlock surface of the microfluidic device to mate with the manifold.

FIG. 12 is a close-up view of an embodiment of a portion of the microfluidic device 11 with demarcations indicating the interlock surface 12 of the chip 10 to mate with the manifold 71. The joining or interlock surface 12 may include an interlock member 14, such as peg holes, that may be employed on the microfluidic device 11 (for example as shown in FIG. 10). Peg holes 14 are an example of an embodiment of the joining surface 12 on the chip 10. There may be any number of peg holes of any shape which is complementary to the shape of the manifold interlock structure 75 or manifold joining surface 77. In other embodiments, the peg holes 14 may be replaced by a structure located on the chip 10 of complementary design to the manifold interlock structures 75 or manifold joining surface 77. In still other embodiments, the chip interlock surface 12 may be any singular or combination of a variety of interlocking structures, surfaces, or means that may include pegs or the openings or recesses to align with pegs, tongues or grooves for interaction with a tongue and groove fastener, hook or loop surface, or an adhesive like glue, paste, or other materials.

Figure 13A:
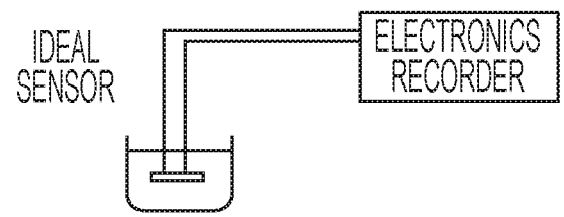
FIG. 13A is a schematic diagram of an embodiment of an ideal chemical sensor.
Figure 13B:
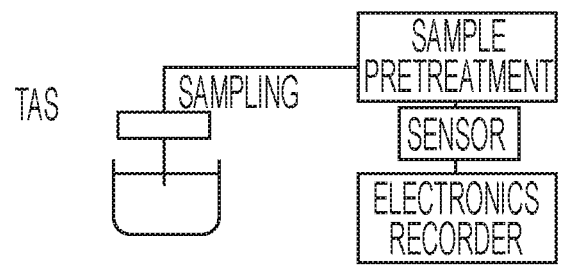
FIG. 13B is a schematic diagram of an embodiment of a "total chemical analysis system" (TAS).
Figure 13C:
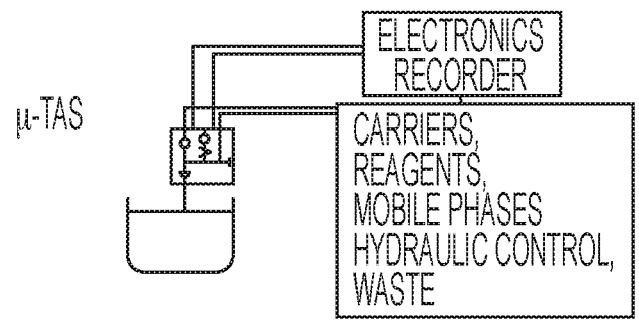
FIG. 13C is a schematic diagram of an embodiment of a miniaturized TAS (μ-TAS).

FIG. 13A-FIG. 13C show different concepts for transforming traditional sensors and devices to chemical lab-on-a-chip (LOC) systems. This led to the concept of a miniaturized total chemical analysis system (μ-TAS). μ-TAS systems decrease costs and increase functionality in a variety of different applications. Oftentimes, these applications are those that can benefit from analyses performed outside of a centralized facility, such as point-of-care (POC) testing and diagnostics, including immunoassays, blood analysis, nucleic acid amplification tests, and flow cytometry. For the success of a microfluidic system as a LOC platform sample handling, automation, and portability for use with minimal training is essential. The significant demand for LOC systems within the forensic sector, i.e., rapid DNA analysis and detection of hazardous material, has grown rapidly in the last decade.

FIG. 13A is a schematic diagram of an embodiment of an ideal chemical sensor.

FIG. 13B is a schematic diagram of an embodiment of a "total chemical analysis system" (TAS).

FIG. 13C is a schematic diagram of an embodiment of a miniaturized TAS (μ-TAS).

Figure 14A:
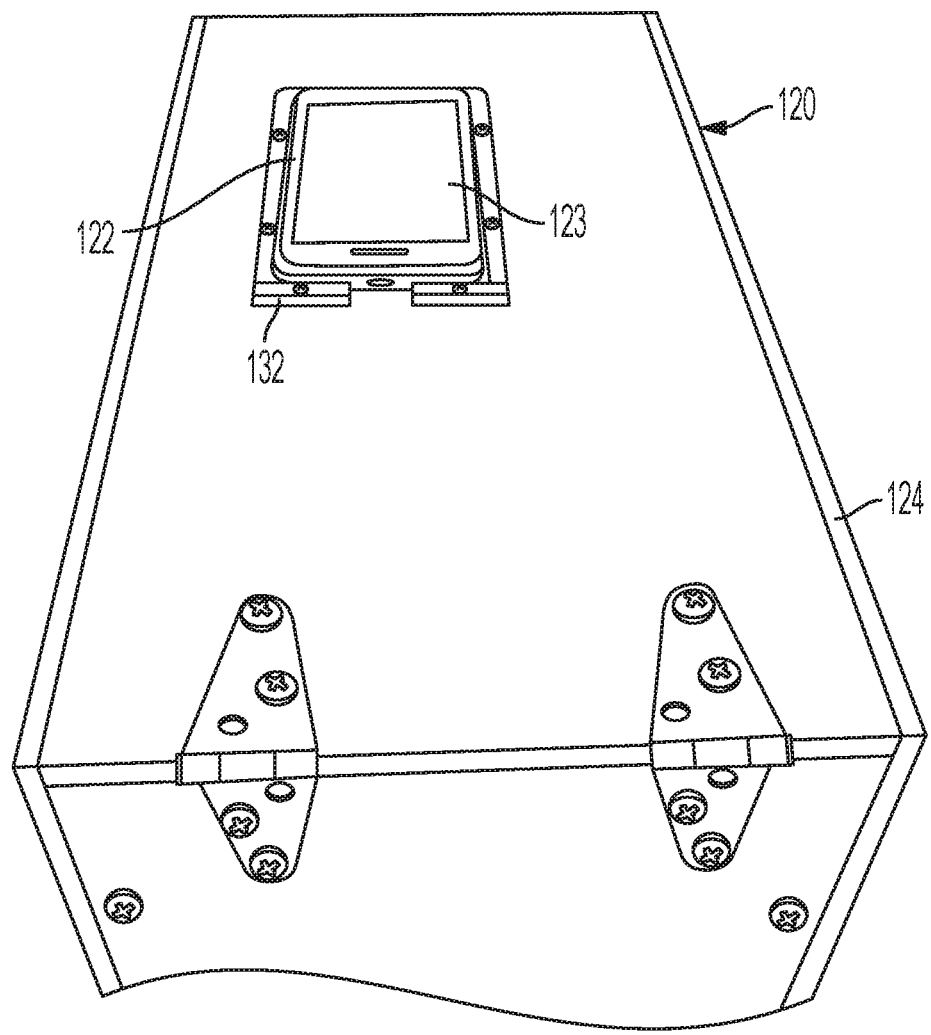
FIG. 14A is a perspective view of a smartphone mounted to a housing for taking a photograph of a microfluidic device (MFD) within the housing.
Figure 14B:
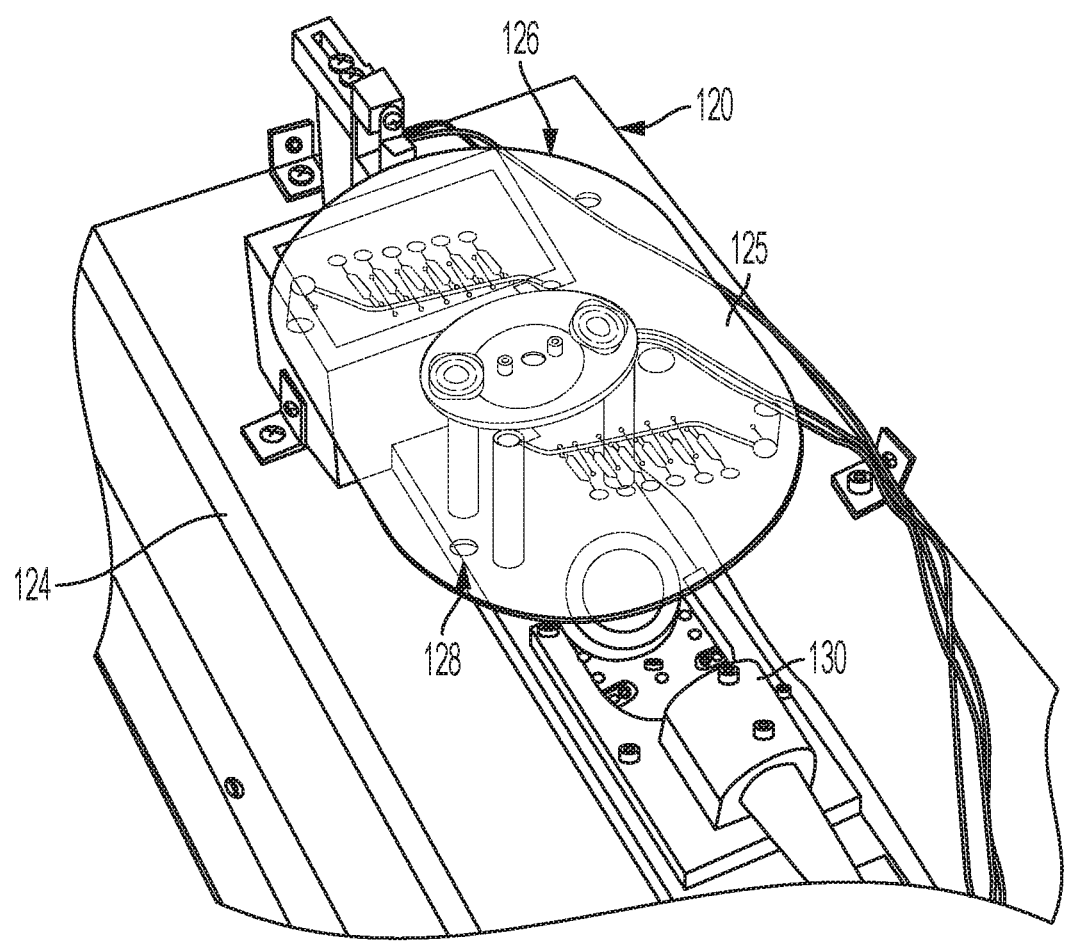
FIG. 14B is a perspective view of a microfluidic device mounted to a system including a spin motor and an optical sensor.

FIG. 14A is a perspective view of analysis system 120 having smartphone 122 mounted to a housing 124 for taking a photograph of a microfluidic device 126, such as shown in FIG. 14B within the housing 124. Instead of a smartphone 122, in an embodiment, the analysis system 120 may utilize any of a variety of cameras, displays, RGB sensors, microprocessor based devices, and computerized devices such as a personal digital assistant (PDA) or personal computer (PC).

FIG. 14B is a perspective view of a microfluidic device 126 mounted to a system 120 including a spin motor 128 and an optical sensor 130 within housing 124. The smartphone 122, housing 124, microfluidic device 126, spin motor 128 and optical sensor 130 comprise components of analysis system 120. In an embodiment, the optical sensor 130 may be used for, but not limited thereto, aligning the microfluidic device so that it may be determined what position the device is at in any given time or so that the position of the microfluidic device may be activated for imaging and/or laser valve actuation; or other desired functions or operations.

Images of the resulting color changes from drug-specific and explosive-specific colorimetric reagents are taken using a camera or video capture device, in this case one from a smartphone 122 or PDA. However, the housing 124 can be used in conjunction with a camera from another system that may be located locally or remotely. The camera of a smartphone 122 is positioned above the microfluidic device 126 using a holder 132 (FIG. 14A). This holder 132 may be made of various materials capable of holding smartphone 122 in place such as plastic or non-plastic materials like PMMA and various metals. This holder 132 may be made of various structures capable positioning or retaining the smartphone 122 in place. The images may be cropped in an application, which may be deployed in a smart cell phone operating system for smartphone 122. Image analysis optimization and validation may be performed by scanning the devices using a device such as a scanner like an EPSON V100 Perfection Photo scanner. Scanned images can be cropped and analyzed using various programs such as ImageJ and Mathematica. Any video that is captured may be analyzed and processed over a time duration that is applicable or needed for obtaining desired information.

Under conditions where the observed color change is either not intense or in the part of the color spectrum where a positive result is not obvious, the system can be augmented using a 'tinting', or color manipulation, approach. The detectable color change can be improved for smartphone or other camera-based image detection in several ways: 1) a physical filter with the desired spectral characteristics can be inserted between the light source and detection chamber, 2) since microfluidic device fabrication involves printing, toner can be printed above or below (or both) detection chamber to tint the color of the light detected by the camera, or 3) reagents may be 'pretreated' as a means of tinting the result from the subsequent reaction with the sample solution. All of these approaches can allow for a shifting, or the color data adjustment, of the post-reaction 'resultant color' in a way that improve the sensitivity or lower the detection limit. An example of this is when a yellow to red color change could be changed to a green to purple color change when a reagent is tinted blue, to provide greater discrimination between the original results. In an embodiment, the filter function may not necessarily be to filter out any particular color or whether filtering should occur. But rather, filtering may be configured to add or combine colors to alter the way the color is perceived, or may be some other manipulation, application, or treatment.

Figure 15A:
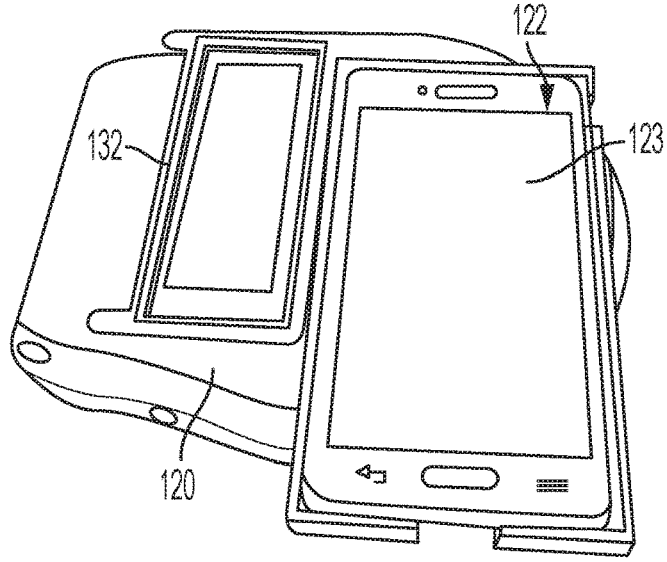
FIG. 15A is a perspective view of a smartphone connected to a housing of a rotation-driven microdevice (RDM).

FIG. 15A is a perspective view of a smartphone 122 or PDA having a screen 123 connected to a housing of the analysis system 120. In an embodiment, the analysis system 120 can be a rotation-driven microdevice (RDM) or centrifugal device. The analysis system 120 can apply a spinning force to the microfluidic device 11 to mix a loaded swab sample with a reagent. The analysis system 120 can align the camera of smartphone 122 with any one, two, or all of the sample channels, detection chambers, or reagent chambers in order to take a photograph of the reaction that occurs between the reagent and sample solution. The photograph image taken by smartphone 122 or PDA can subsequently be analyzed via software present in smartphone 122 or PDA to analyze, among other things, the hue and saturation of the reaction for comparison to previously determined threshold levels of various substances to determine the identity of the sample.

Figure 15B:
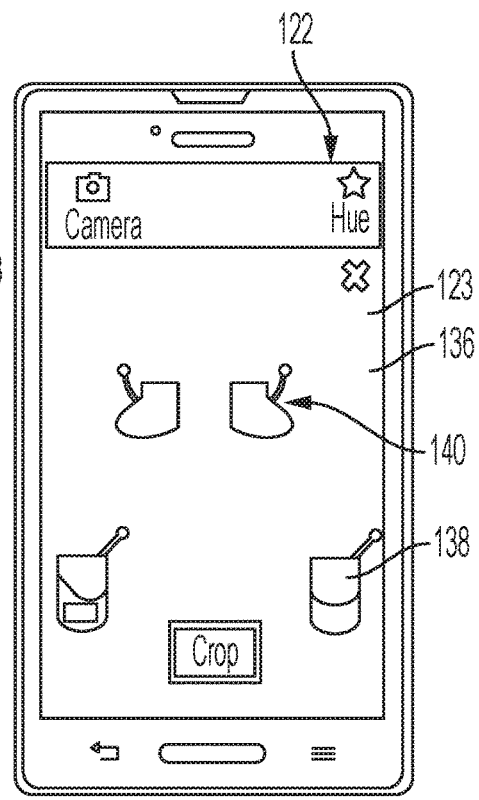
FIG. 15B is a schematic diagram including a screenshot of a smartphone showing an image of a detection area of a microfluidic device.

FIG. 15B includes a screenshot of a smartphone 122 or PDA showing an image 136 of a detection area 138 of a microfluidic device 140.

Figure 15C:
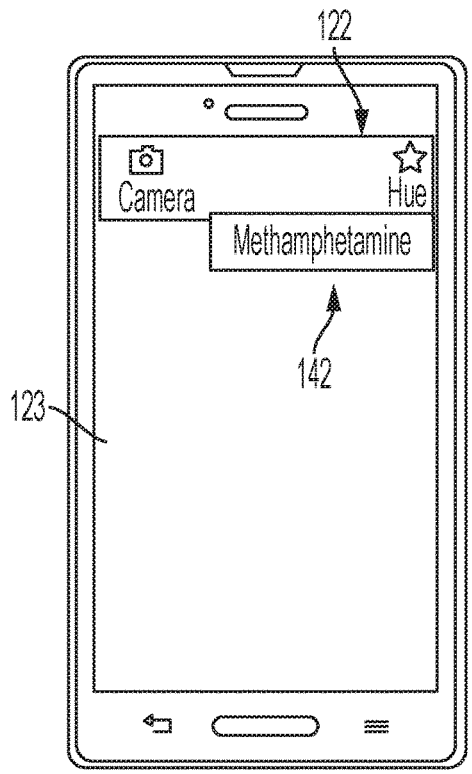
FIG. 15C is a schematic diagram including a screenshot of a smartphone showing a color change of a reagent in the detection area of FIG. 14B.

FIG. 15C includes a screenshot of a smartphone 122 representing a color change of a reagent in detection area 138 of FIG. 15B and an indicia 142 of a possible substance match.

Figure 15D:
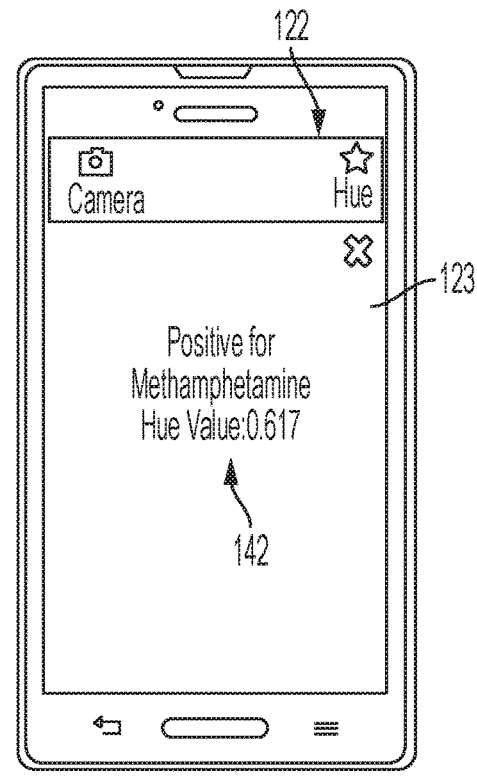
FIG. 15D is a screenshot of a smartphone identifying a substance associated with the color change of the reagent of FIG. 14C.

FIG. 15D includes a screenshot of a smartphone 122 identifying a substance associated with the color change of the reagent of FIG. 15C via indicia 142. The indicia 142 can comprise a digital graphical indication provided on smartphone 122, such as a spelling of the identified substance (such as methamphetamine), or suggestions as to possible identities of the substance, or indications that the substance does not match any reference information stored in the smartphone 122 or elsewhere, or other similar information.

In one embodiment, the components incorporated into a system would accommodate a microfluidic device where sample, in liquid or solid form, was loaded into the microdevice via swab that when exposed to some form of force (mechanical, gravitational, heat energy, gas expansion, etc.) and/or solvent delivery, via solvent capsules 25 for example, facilitates sample movement from a load site to the location of the reagents; subsequent interaction of sample components with the reagent(s) allowing for a color-based detection end-result for explosives, narcotics, and other substances. This system could incorporate a spin motor, cameras, software, laser actuators, optical sensors, cell phone, etc. to achieve these results. This approach (method, system, detection, reagent storage, etc.) can be extended to any sample/reagent combination where a color change results.

Figure 16A:
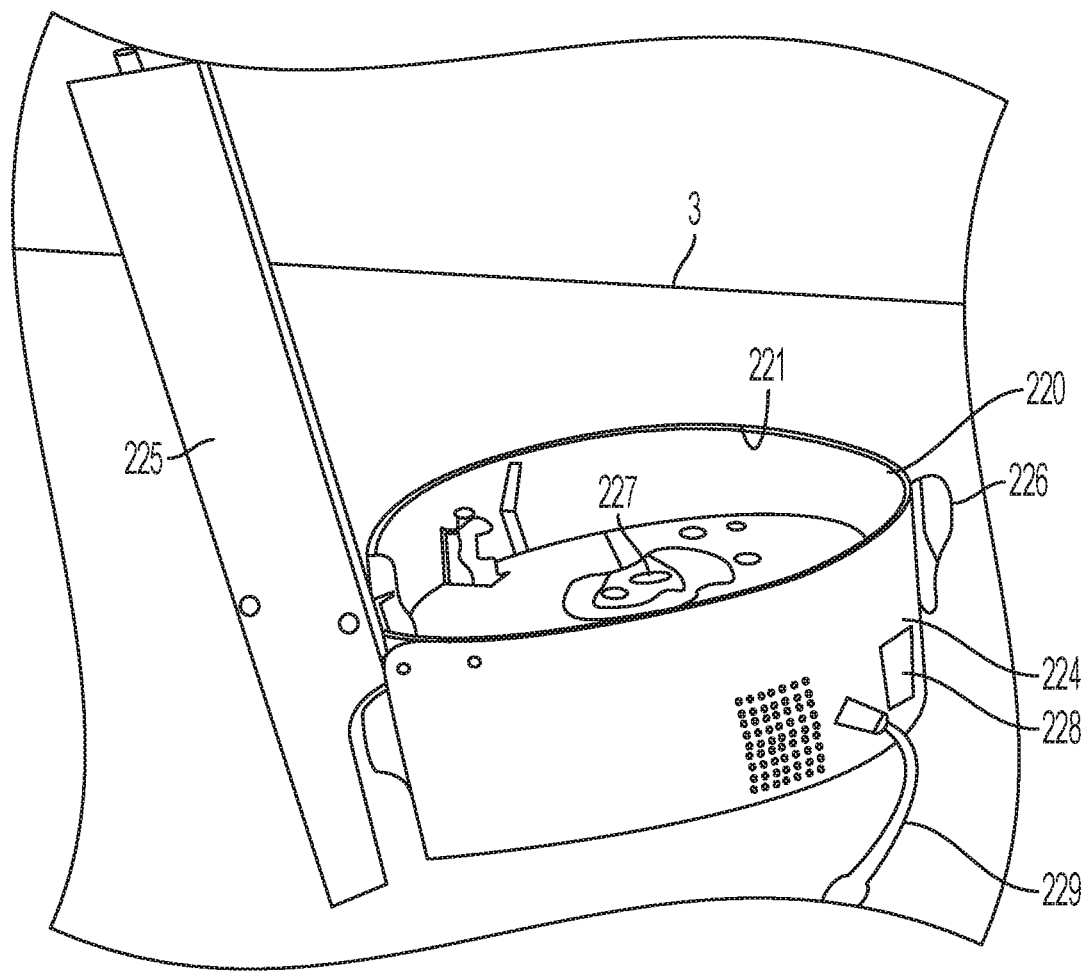
FIG. 16A is a perspective view of another type of RDM in an open lid position vacant of a MFD.

FIG. 16A is a perspective view of another embodiment of an analysis system 220 contained in a housing 224 shown as an RDM, with its lid 225 in an open position vacant of a microfluidic device (MFD). In an embodiment the microfluidic device may be inserted into a compartment 221 where it may attach to holder 227. In an embodiment, the holder 227 is a structure similar to that of a holder in a CD player, being a single centrally located point where the MFD may be attached. In another embodiment, the holder 227 may be a number of pegs which can insert into or through the MFD to hold it in place while the MFD is spun. In other embodiments, the holder 227 may be any restraint system known or to be known in the art for the securing of an MFD during the analysis process.

The analysis system 220 may be portable and without a stand as depicted in FIG. 16A, resting on table 3. In another embodiment, the analysis system 220 may have its own stand system. The analysis system 220 may have a latch 226 to secure the lid 225, an on/off switch 228, and a power cord 229 leading to a power source. In another embodiment the analysis system 220 does not have a dedicated on/off switch 228, but instead may be controlled via an attached screen or smartphone.

Referring again to FIG. 16A, in this and other embodiments disclosed herein, the transmission of power may be accomplished via a single or multiple power cords 228. This power cord 228 may able to be plugged into an outlet or may be designed so as to be connected to a local battery pack or something of the like. In this or other embodiments disclosed herein, this may be also be accomplished via wireless power transmission. The analysis system 220 may be connected to a power source either locally or remotely. This connection in some embodiments may not require a power cord 228. The power may be supplied by battery, solar, DC supply, AC supply, or any other energy means available. In an embodiment, the system could incorporate a spin motor, cameras, software, laser actuators, optical sensors, cell phone, etc. to achieve the applicable results. In one aspect, among other steps and operations, the system may perform a given spin step and then may not perform the next spin step using the motor (or other applicable operation) until the cell phone captures the image (or other applicable operation).

Figure 16B:
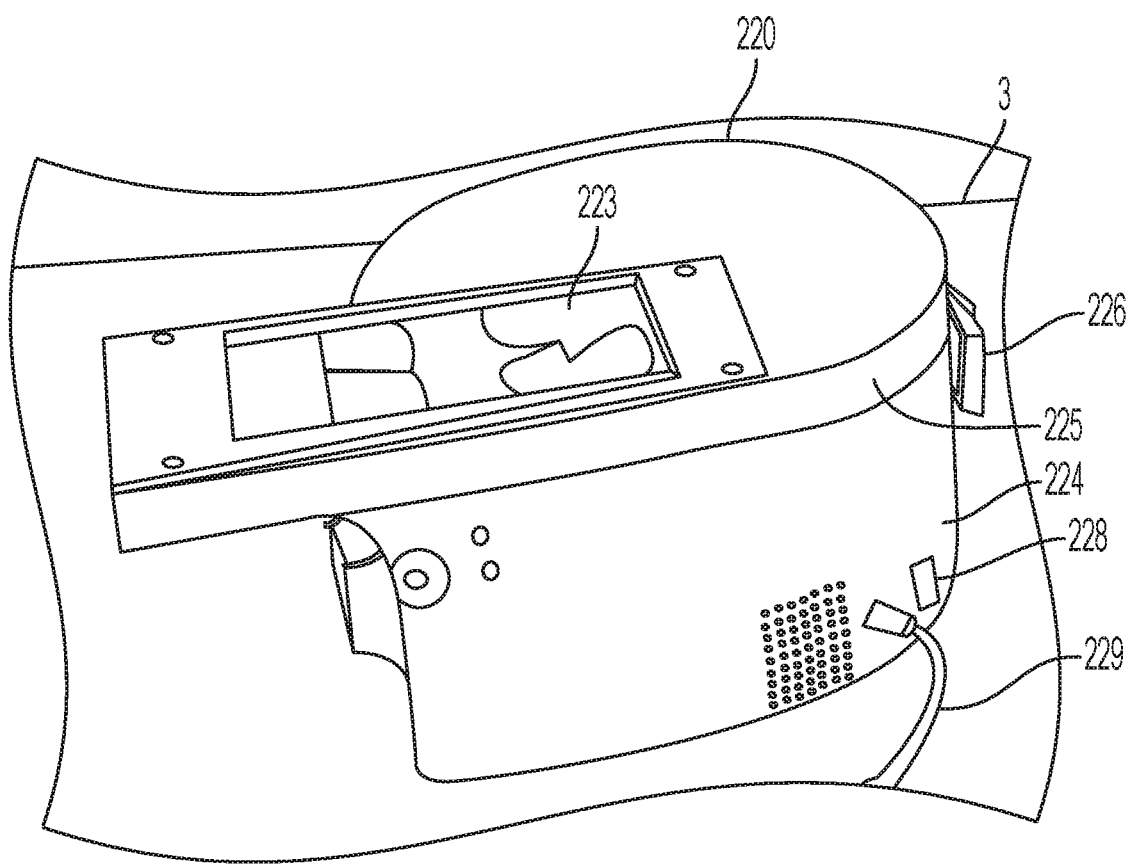
FIG. 16B is a perspective view of the RDM of FIG. 15A with a closed lid, making the digital interface visible.

FIG. 16B is a perspective view of an embodiment of analysis system 220 of FIG. 15A with a closed lid 225, making the digital interface 223 visible in this illustration. In an exemplary embodiment, the analysis system 220 may have a latch 226 that may be engaged when the lid 225 is closed to hold the lid 225 closed or secure for the duration of the analysis process. In an embodiment, the latch 226 is a manually engaged latch. In another embodiment the latch 226 is controlled by the analysis system 220 and is engaged when the lid is closed or the system is engaged to run. In yet another embodiment, the latch 226 (or locking mechanism or device) may be programmed to engage at any user desired or programmed time. In an embodiment, for example but not limited thereto, the lid in the closed position may serve as a safety feature, wherein the system will not activate a laser or spin (or spin speed or other applicable operation) while the lid is in an open position.

Referring again to FIG. 16B, in this and other embodiments disclosed herein, the screen 223 may be the screen of a smartphone or of a dedicated computerized digital display. A processor implemented with the various embodiments discussed herein, may be integrally formed with the general housing or may be part of a smartphone, PDA, or like such that it is a component that may be used with (or mounted to) the general housing. Alternatively, the design may include processors which in one aspect is integrally formed with the general housing and another aspect is a separate component wherein it exists as part of a smartphone, PDA, or the like that is used with (or mounted to) the general housing. In another embodiment, the analysis system 220 may be wirelessly controlled and screen 223 may not be needed. The data may be transmitted to a remote screen; or a local and/or remote computer, PDA, microprocessor based device, or data storage medium or other output device (such as a graphical interface or printer).

EXAMPLES

Practice of an aspect of an embodiment (or embodiments) of the invention will be still more fully understood from the following examples and experimental results, which are presented herein for illustration only and should not be construed as limiting the invention in any way.

Example 1. A microfluidic device for use with a swab and a solvent for colorimetric detection for substance identification. The microfluidic device comprising: a microfluidic chip; a solvent capsule disposed on said microfluidic chip configured to contain said solvent; a chamber well configured to receive said swab; a microfluidic channel disposed on said microfluidic chip, and in communication with said solvent capsule and said chamber well; and said solvent capsule is configured to be able to allow said solvent to escape and interact with said swab, intended to be positioned in said chamber well, via said microfluidic channel.

Example 2. The microfluidic device of example 1, wherein said microfluidic chip is configured to accept a reagent.

Example 3. The microfluidic device of example 1 (as well as subject matter in whole or in part of example 2), wherein said microfluidic chip comprises a reagent chamber configured to hold a reagent.

Example 4. The microfluidic device of example 1 (as well as subject matter of one or more of any combination of examples 2-3, in whole or in part), wherein said microfluidic chip is configured to be able to allow a reagent to interact with a mixture containing said solvent.

Example 5. The microfluidic device of example 1 (as well as subject matter of one or more of any combination of examples 2-4 in whole or in part), further comprising a kit, wherein said kit includes said solvent contained in said solvent capsule.

Example 6. The microfluidic device of example 1 (as well as subject matter of one or more of any combination of examples 2-5, in whole or in part), further comprising a kit, wherein said kit includes said reagent contained in said reagent chamber.

Example 7. The microfluidic device of example 1 (as well as subject matter of one or more of any combination of examples 2-6, in whole or in part), further comprising a kit, wherein said kit includes said swab.

Example 8. The microfluidic device of example 1 (as well as subject matter of one or more of any combination of examples 2-7, in whole or in part), further comprising a kit, wherein said kit includes said solvent material, reagent material, and one or more swabs.

Example 9. The microfluidic device of example 1 (as well as subject matter of one or more of any combination of examples 2-8, in whole or in part), wherein a mating surface is disposed on said device, said mating surface is configured to attach said swab to said microfluidic disk.

Example 10. The microfluidic device of example 9, wherein said mating surface is an adhesive material.

Example 11. The microfluidic device of example 1 (as well as subject matter of one or more of any combination of examples 2-10, in whole or in part), further comprising a handle configured for use with said swab.

Example 12. The microfluidic device of example 11, wherein said handle is comprised of one or more of the following materials: 3D printed material, plastics, PVC, aluminum, or nylon.

Example 13. The microfluidic device of example 11 (as well as subject matter in whole or in part of example 12), wherein said handle is connected to a retainer.

Example 14. The microfluidic device of example 11 (as well as subject matter of one or more of any combination of examples 12-13, in whole or in part), further comprising a release mechanism that is connected to the handle, wherein said release mechanism is configured to assist in the release of said swab.

Example 15. The microfluidic device of example 14, wherein said release mechanism comprises a spring.

Example 16. The microfluidic device of example 11 (as well as subject matter of one or more of any combination of examples 12-15, in whole or in part), further comprising an ejector mechanism connected to the handle, said ejector configured to assist in the release of said swab.

Example 17. The microfluidic device of example 16, wherein said ejector mechanism is configured to attach to a plunger mechanism for releasing said swab from a retainer.

Example 18. The microfluidic device of example 1 (as well as subject matter of one or more of any combination of examples 2-17, in whole or in part), wherein said chamber well is disposed on said microfluidic chip.

Example 19. The microfluidic device of example 1 (as well as subject matter of one or more of any combination of examples 2-18, in whole or in part), wherein said chamber well is attached to said microfluidic chip.

Example 20. The microfluidic device of example 1 (as well as subject matter of one or more of any combination of examples 2-19, in whole or in part), wherein said chamber well is configured to substantially correspond with a shape of said swab.

Example 21. The microfluidic device of example 1 (as well as subject matter of one or more of any combination of examples 2-20, in whole or in part), wherein said chamber well is configured to substantially correspond with a shape of a retainer capable of holding said swab.

Example 22. The microfluidic device of example 1 (as well as subject matter of one or more of any combination of examples 2-21, in whole or in part), further comprising a manifold configured to attach to said microfluidic chip.

Example 23. The microfluidic device of example 1 (as well as subject matter of one or more of any combination of examples 2-22, in whole or in part), further comprising a manifold configured to be disposed on said microfluidic chip.

Example 24. The microfluidic device of example 23, wherein said manifold has topography which is capable of interlocking with the topography of said microfluidic chip.

Example 25. The microfluidic device of example 23 (as well as subject matter in whole or in part of example 24), wherein said manifold includes an aperture wherein said aperture substantially corresponds to the shape of said swab.

Example 26. The microfluidic device of example 25, wherein said manifold includes an aperture wherein said aperture substantially corresponds to the shape of a retainer capable of holding said swab.

Example 27. The microfluidic device of example 23 (as well as subject matter of one or more of any combination of examples 24-26, in whole or in part), further comprising said mating surface, wherein said mating surface is disposed on the microfluidic device inside of an aperture of said manifold.

Example 28. The microfluidic device of example 1 (as well as subject matter of one or more of any combination of examples 2-27, in whole or in part), wherein said solvent capsule is comprised of one or more of the following materials: glass, polymers, foil, or plastic.

Example 29. The microfluidic device of example 1 (as well as subject matter of one or more of any combination of examples 2-28, in whole or in part), further comprising a plurality of solvent capsules.

Example 30. The solvent capsule of example 29, wherein said solvent capsule is configured to contain different solvents.

Example 31. The microfluidic device of example 1 (as well as subject matter of one or more of any combination of examples 2-30, in whole or in part), wherein said solvent capsule is configured to be caused by human hands to release the solvent contained in said solvent capsule.

Example 32. The microfluidic device of example 1 (as well as subject matter of one or more of any combination of examples 2-31, in whole or in part), wherein said solvent capsule is configured to be caused by laser to release the solvent contained in said solvent capsule.

Example 33. The microfluidic device of example 1 (as well as subject matter of one or more of any combination of examples 2-32, in whole or in part), wherein said solvent capsule is configured to be capable of being crushed or punctured by an outside device.

Example 34. The microfluidic device of example 1 (as well as subject matter of one or more of any combination of examples 2-33, in whole or in part), wherein said device is configured to be able to test for trace presences of multiple substances in a single test.

Example 35. The microfluidic device of example 1 (as well as subject matter of one or more of any combination of examples 2-34, in whole or in part), wherein said device is configured to be able to test a plurality of portions of said swab substantially simultaneously.

Example 36. The microfluidic device of example 1 (as well as subject matter of one or more of any combination of examples 2-35, in whole or in part), wherein said device is configured to direct said solvent to different regions of said microfluidic chip, with said solvent passing through each of a plurality of said chamber wells being directed to a separate region on said chip.

Example 37. The microfluidic device of example 1 (as well as subject matter of one or more of any combination of examples 2-36, in whole or in part), further comprising a tracking feature disposed on said device.

Example 38. A method for identifying a substance, wherein said method comprising: inserting a swab in a microfluidic device having a solvent disposed in a solvent capsule connected to a detection chamber; spinning said microfluidic device to move a mixture of the substance and the solvent to the detection chamber; capturing a digital image of a reaction between said mixture and a reagent; and determining the status of said substance based on said digital image.

Example 39. The method of example 38, wherein said determining the status of said substance includes the following: analyzing the digital image of the reaction to determine a color parameter; comparing the color parameter to a reference parameter of a reference composition; and assessing the comparison to determine if the substance is the reference composition.

Example 40. The method of example 39, further comprising outputting visible indicia of the comparison, wherein the visible indicia comprises a digital graphical indication.

Example 41. The method of example 39 (as well as subject matter in whole or in part of example 40), wherein analyzing the digital image of the reaction to determine the color parameter comprises determining a hue of the digital image of the reaction.

Example 42. The method of example 39 (as well as subject matter of one or more of any combination of examples 40-41, in whole or in part), wherein analyzing the digital image of the reaction to determine the color parameter comprises determining a saturation of the digital image of the reaction.

Example 43. The method of example 38 (as well as subject matter of one or more of any combination of examples 39-42, in whole or in part), wherein said spinning said microfluidic device comprises attaching said microfluidic device to a spin motor disposed within a housing; and said method further comprising attaching a personal digital assistant (PDA) to a housing, wherein capturing a digital image of the reaction comprises using a digital camera of the PDA to capture the digital image.

Example 44. The method of example 43, wherein said PDA is a smartphone.

Example 45. The method of example 38 (as well as subject matter of one or more of any combination of examples 39-44, in whole or in part), wherein said spinning said microfluidic device comprises attaching the microfluidic device to a spin motor disposed within a housing; and having a microprocessor device configured to determine the status of said substance based on said digital image.

Example 46. The method of example 38 (as well as subject matter of one or more of any combination of examples 39-45, in whole or in part), wherein said inserting said swab comprises inserting said swab into a chamber well in communication with said microfluidic device.

Example 47. A method for identifying a substance. The method comprising: inserting a swab in a microfluidic device having a solvent disposed thereon; applying a force to move the substance and the solvent relative to each other to mix the substance and solvent; applying a force to move said mixture and a reagent to mix with one another to provide a reaction; capturing a digital image of the reaction; and determining the status of said substance based on said digital image.

Example 48. The method of example 47, wherein said determining the status of said substance includes the following: analyzing the digital image of the reaction to determine a color parameter; comparing the color parameter to a reference parameter of a reference composition; and assessing the comparison to determine if the substance is the reference composition.

Example 49. The method of example 47 (as well as subject matter in whole or in part of example 48), wherein said inserting said swab comprises inserting said swab into a chamber well that is disposed on said microfluidic device.

Example 50. The method of using any of the devices (structures or systems, or material) or its components or sub-components provided in any one or more of examples 1-37, in whole or in part.

Example 51. The method of manufacturing any of the devices (structures or systems, or material) or its components or sub-components provided in any one or more of examples 1-37, in whole or in part.

Example 52. A non-transitory machine readable medium including instructions for identifying a substance, which when executed by a machine, cause the machine to perform any of the steps or activities provided in any one or more of examples 38-49.

Each of these non-limiting examples can stand on its own, or can be combined in various permutations or combinations with one or more of the other examples. Each of these non-limiting examples can stand on its own, or can be combined in various permutations or combinations with one or more of the embodiments disclosed herein.

REFERENCES

The following patents, applications and publications as listed below and throughout this document are hereby incorporated by reference in their entirety herein, and which are not admitted to be prior art with respect to the present invention by inclusion in this section:

1. Hargreaves, M. D., et al., Analysis of seized drugs using portable Raman spectroscopy in an airport environment—a proof of principle study. Journal of Raman Spectroscopy, 2008. 39(7): p. 873-880.

2. Valussi, S. and M. Underhill, Raman and infrared techniques for fighting drug-related crime: a preliminary assessment. PROCEEDINGS OF SPIE—THE INTERNATIONAL SOCIETY FOR OPTICAL ENGINEERING, 2006. 6402.

3. Manz, A., N. Graber, and H. M. Widmer, MINIATURIZED TOTAL CHEMICAL-ANALYSIS SYSTEMS—A NOVEL CONCEPT FOR CHEMICAL SENSING. Sensors and Actuators B-Chemical, 1990. 1(1-6): p. 244-248.

4. Manz, A., et al., Miniaturization of Chemical Analysis Systems-A Look into Next Century's Technology or Just a Fashionable Craze? Chimia 1991. 45: p. 103.

5. Le Roux, D., et al., An integrated sample-in-answer-out microfluidic chip for rapid human identification by STR analysis. Lab on a Chip, 2014. 14(22): p. 4415-4425.

6. Chin, C. D., et al., Mobile Device for Disease Diagnosis and Data Tracking in Resource-Limited Settings. Clinical Chemistry, 2013. 59(4): p. 629-640.

7. Madou, M. J. and G. J. Kellogg, LabCD: a centrifuge-based microfluidic platform for diagnostics. Proc. SPIE Systems and Technologies for Clinical Diagnostics and Drug Discovery, 1998. 3259: p. 80-93.

8. Fiorini, G. S. and D. T. Chiu, Disposable microfluidic devices: fabrication, function, and application. Biotechniques, 2005. 38(3): p. 429-446.

9. Xia, Y. N. and G. M. Whitesides, Soft lithography. Angewandte Chemie-International Edition, 1998. 37(5): p. 550-575.

10. Becker, H. and C. Gartner, Polymer microfabrication methods for microfluidic analytical applications. Electrophoresis, 2000. 21(1): p. 12-26.

11. Whitesides, G. M., et al., Soft lithography in biology and biochemistry. Annual Review of Biomedical Engineering, 2001. 3: p. 335-373.

12. Coltro, W. K. T., et al., Toner and paper-based fabrication techniques for microfluidic applications. Electrophoresis, 2010. 31(15): p. 2487-2498.

13. Thompson, B. L., et al., Inexpensive, rapid prototyping of microfluidic devices using overhead transparencies and a laser print, cut and laminate fabrication method. Nature Protocols, 2015. 10(6): p. 875-886.

ADDITIONAL REFERENCES

The devices, systems, apparatuses, compositions, materials, machine readable medium, computer program products, and methods of various embodiments of the invention disclosed herein may utilize aspects disclosed in the following references, applications, publications and patents and which are hereby incorporated by reference herein in their entirety, and which are not admitted to be prior art with respect to the present invention by inclusion in this section:

A. U.S. Utility patent application Ser. No. 16/039,184, entitled "METHOD FOR DETECTING NUCLEIC ACIDS BASED ON AGGREGATE FORMATION", filed Jul. 18, 2018.

B. U.S. Utility patent application Ser. No. 13/699,983, entitled "METHOD FOR DETECTING NUCLEIC ACIDS BASED ON AGGREGATE FORMATION", filed Nov. 26, 2012; Publication No. 2013/0203045, Aug. 8, 2013.

C. International Patent Application Serial No. PCT/US2011/038166, entitled "METHOD FOR DETECTING NUCLEIC ACIDS BASED ON AGGREGATE FORMATION", filed May 26, 2011; Publication No. WO 2011/150226, Dec. 1, 2011.

D. U.S. Utility patent application Ser. No. 15/770,413, entitled "DEVICES, SYSTEMS AND METHODS FOR SAMPLE DETECTION", filed Apr. 23, 2018.

E. International Patent Application Serial No. PCT/US2016/058263, entitled "DEVICES, SYSTEMS AND METHODS FOR SAMPLE DETECTION", filed Oct. 21, 2016; Publication No. WO 2017/070571, Apr. 27, 2017.

F. U.S. Utility patent application Ser. No. 15/770,035, entitled "SYSTEMS, DEVICES AND METHODS FOR ANALYZING AND IDENTIFYING SUBSTANCES", filed Apr. 20, 2018; Publication No. US-2018-0313765-A1, Nov. 1, 2018.

G. International Patent Application Serial No. PCT/US2016/058304, entitled "SYSTEMS, DEVICES AND METHODS FOR ANALYZING AND IDENTIFYING SUBSTANCES", filed Oct. 21, 2016; Publication No. WO 2017/070607, Apr. 27, 2017.

H. U.S. Utility patent application Ser. No. 15/768,115, entitled "DEVICES AND METHODS FOR EXTRACTION, SEPARATION AND THERMOCYCLING", filed Apr. 13, 2018; Publication No. US-2018-0304253-A1, Oct. 25, 2018.

I. International Patent Application Serial No. PCT/US2016/056906, entitled "DEVICES AND METHODS FOR EXTRACTION, SEPARATION AND THERMOCYCLING", filed Oct. 13, 2016; Publication No. WO 2017/066485, Apr. 20, 2017.

J. International Patent Application Serial No. PCT/US2018/017213, entitled "MICRODEVICE FOR DIFFERENTIAL SEPARATION, PURIFICATION AND AMPLIFICATION OF FORENSIC SAMPLES", filed Feb. 7, 2018; Publication No. WO 2018/148271, Aug. 16, 2018.

K. U.S. Utility patent application Ser. No. 14/650,743, entitled "FREQUENCY-BASED FILTERING OF MECHANICAL ACTUATION USING FLUIDIC DEVICE", filed Jun. 9, 2015; U.S. Pat. No. 9,987,576, issued Jun. 5, 2018.

L. International Patent Application Serial No. PCT/US2013/074152, entitled "FREQUENCY-BASED FILTERING OF MECHANICAL ACTUATION USING FLUIDIC DEVICE", filed Dec. 10, 2013; Publication No. WO 2014/093360, Jun. 19, 2014.

M. U.S. Utility patent application Ser. No. 14/503,955, entitled "MICROFLUIDIC VALVE SYSTEMS", filed Oct. 1, 2014; Publication No. 2015/0093838, Apr. 2, 2015.

N. U.S. Utility patent application Ser. No. 13/849,691, entitled "Electrostatic Actuation for Management of Flow in Micro Total Analysis Systems and Related Method Thereof", filed Mar. 25, 2013.

O. U.S. Utility patent application Ser. No. 13/294,908, entitled "Electrostatic Actuation for Management of Flow in Micro-Total Analysis Systems (u-TAS) and Related Method Thereof", filed Nov. 11, 2011; U.S. Pat. No. 8,403,294, issued Mar. 26, 2013.

P. U.S. Utility patent application Ser. No. 11/665,326, entitled "Electrostatic Actuation for Management of Flow in Micro Total Analysis Systems and Related Method Thereof", filed Apr. 13, 2007; U.S. Pat. No. 8,056,881, issued Nov. 15, 2011.

Q. International Patent Application Serial No. PCT/US2005/036675, entitled "Electrostatic Actuation for Management of Flow in Micro Total Analysis Systems and Related Method Thereof", filed Oct. 13, 2005; Publication No. WO06044458, Apr. 27, 2006.

R. U.S. Utility patent application Ser. No. 13/474,420, entitled "Passive Components for Micro-Fluidic Flow Profile Shaping and Related Method Thereof", filed May 17, 2012; U.S. Pat. No. 9,050,596, issued Jun. 9, 2015.

S. U.S. Utility patent application Ser. No. 12/064,557, entitled "Passive Components for Micro-Fluidic Flow Profile Shaping and Related Method Thereof", filed Feb. 22, 2008; U.S. Pat. No. 8,220,493, issued Jul. 17, 2012.

T. International Patent Application Serial No. PCT/US2006/032717, entitled "Passive Components for Micro-Fluidic Flow Profile Shaping and Related Method Thereof", filed Aug. 23, 2006; Publication No. WO 2007/024829, Mar. 1, 2007.

U. International Patent Application Serial No. PCT/US2012/036105, entitled "METHOD AND SYSTEM FOR HIGH THROUGHPUT OPTICAL AND LABEL FREE DETECTION OF ANALYTES", filed May 2, 2012; Publication No. WO 2012/151268, Nov. 8, 2012.

V. International Patent Application Serial No. PCT/US2012/036139, entitled "METHOD AND SYSTEM TO DETECT AGGREGATE FORMATION ON A SUBSTRATE", filed May 2, 2012; Publication No. WO 2012/151289, Nov. 8, 2012.

W. U.S. Utility patent application Ser. No. 13/505,406, entitled "VERSATILE, VISIBLE METHOD FOR DETECTING POLYMERIC ANALYTES", filed May 1, 2012; Publication No. 2013/0084565, Apr. 4, 2013.

X. U.S. Utility patent application Ser. No. 13/116,659, entitled "METHOD FOR DETECTING NUCLEATED CELLS", filed May 26, 2011; Publication No. 2012/0149587, Jun. 14, 2012.

Y. International Patent Application Serial No. PCT/US2010/002883, entitled "VERSATILE, VISIBLE METHOD FOR DETECTING POLYMERIC ANALYTES", filed Nov. 3, 2010; Publication No. WO 2011/056215, May 12, 2011.

Z. U.S. Utility patent application Ser. No. 12/879,810, entitled "DETECTION OF POLYMERIC ANALYTES", filed Sep. 10, 2010; Publication No. 2011/0070660, Mar. 24, 2011.

AA. International Patent Application Serial No. PCT/US2009/036983, entitled "DETECTION OF POLYMERIC ANALYTES", filed Mar. 12, 2009; Publication No. WO 2009/114709, Sep. 17, 2009.

BB. U.S. Utility patent application Ser. No. 12/892,618, entitled "DNA EXTRACTION USING A PHOTO-POLYMERIZED MONOLITH IN A CAPILLARY", filed Sep. 28, 2010; U.S. Pat. No. 9,044,735, issued Jun. 2, 2015.

CC. U.S. Utility patent application Ser. No. 11/885,181, entitled "Grafted Photo-Polymerized Monolithic Column", filed Aug. 28, 2007; Publication No. 2009/0014388, Jan. 15, 2009.

DD. International Patent Application Serial No. PCT/US2006/006845, entitled "DNA Extraction Using a Photo- Polymerized Monolith in a Capillary", filed Feb. 28, 2006; Publication No. WO06093865, Sep. 8, 2006.

EE. International Patent Application Serial No. PCT/US2010/026791, entitled "MULTIPLE-SAMPLE MICROFLUIDIC CHIP FOR DNA ANALYSIS", filed Mar. 10, 2010; Publication No. WO 2010/141139, Dec. 9, 2010.

FF. International Patent Application Serial No. PCT/US2010/026801, entitled "Optical Approach for Microfluidic DNA Electrophoresis Detection", filed Mar. 10, 2010; Publication No. WO 2010/141140, Dec. 9, 2010.

GG. U.S. Utility patent application Ser. No. 12/090,233, entitled "Integrated Microfluidic Analysis Systems", filed Apr. 14, 2008; Publication No. 2009/0170092, Jul. 2, 2009.

HH. International Patent Application Serial No. PCT/US2006/039809, entitled "Integrated Microfluidic Analysis Systems", filed Oct. 12, 2006; Publication No. WO 2007/047336, Apr. 26, 2007.

II. U.S. Utility patent application Ser. No. 12/089,320, entitled "Microchip-based Acoustic Trapping or Capture of Cells for Forensic Analysis and Related Method Thereof", filed Apr. 4, 2008; Publication No. 2011/0033922, Feb. 10, 2011.

JJ. International Patent Application Serial No. PCT/US2006/038943, entitled "Microchip-based Acoustic Trapping or Capture of Cells for Forensic Analysis and Related Method Thereof", filed Oct. 4, 2006; Publication No. WO 2007/041671, Apr. 12, 2007.

KK. U.S. Utility patent application Ser. No. 11/989,794, entitled "Microdevices for Chemical Sensing and Chemical Actuation", filed Jan. 31, 2008; U.S. Pat. No. 8,343,755, issued Jan. 1, 2013.

LL. International Patent Application Serial No. PCT/US2006/030127, entitled "Microdevices for Chemical Sensing and Chemical Actuation", filed Aug. 1, 2006; Publication No. WO 2007/030240, Mar. 15, 2007.

MM. U.S. Utility patent application Ser. No. 11/793,428, entitled "Use of Microwaves for Thermal and Non-Thermal Applications in Micro and Nanoscale Devices", filed Jan. 7, 2008; Publication No. 2008/0277387, Nov. 13, 2008.

NN. International Patent Application Serial No. PCT/US2005/046756, entitled "The Use of Microwaves for Thermal and Non-Thermal Applications in Micro and Nanoscale Devices", filed Dec. 22, 2005; Publication No. WO06069305, Jun. 29, 2006.

OO. International Patent Application Serial No. PCT/US2007/088662, entitled "Non-Contact Thermal Control of Small Volume and Related Apparatus Thereof", filed Dec. 21, 2007; Publication No. WO 2008/080106, Jul. 3, 2008.

PP. International Patent Application Serial No. PCT/US2007/083964, entitled "DNA Purification in a Multi-Stage, Multi-Phase Microchip", filed Nov. 7, 2007; Publication No. WO 2008/058204, May 15, 2008.

QQ. U.S. Utility patent application Ser. No. 11/884,351, entitled "Nucleic Acid Isolation Methods and Materials and Devices Thereof", filed Aug. 15, 2007; Publication No. 2009/0215124, Aug. 27, 2009.

RR. International Patent Application Serial No. PCT/US2006/005241, entitled "Nucleic Acid Isolation Methods and Materials and Devices Thereof", filed Feb. 15, 2006; Publication No. WO06088907, Aug. 24, 2006.

SS. U.S. Utility patent application Ser. No. 11/664,297, entitled "Localized Control of Thermal Properties on Microdevices and Applications Thereof", filed Mar. 19, 2007; Publication No. 2008/0193961, Aug. 14, 2008.

TT. International Patent Application Serial No. US2005/034674, entitled "Localized Control of Thermal Properties on Microdevices and Applications Thereof", filed Sep. 9, 2005; Publication No. WO06039293, Apr. 13, 2006.

UU. U.S. Utility patent application Ser. No. 10/535,926, entitled "Isolation of Sperm Cells from Other Biological Materials Using Microfabricated Devices and Related Methods Thereof", filed May 23, 2005; Publication No. —060144707, Jul. 6, 2006.

VV. International Patent Application Serial No. US2003/037205, entitled "Isolation of Sperm Cells from Other Biological Materials Using Microfabricated Devices and Related Methods Thereof", filed Nov. 20, 2003; Publication No. WO04046712, Jun. 3, 2004.

WW. U.S. Utility patent application Ser. No. 10/530,728, entitled "Methods and Systems for Multiplexing IR-Mediated Heating on a Microchip", filed Apr. 8, 2005; Publication No. 05-0287661, Dec. 29, 2005.

XX. International Patent Application Serial No. US2003/031806, entitled "Methods and Systems for Multiplexing IR Mediated Heating on a Microchip", filed Oct. 8, 2003; Publication No. WO04033099, Apr. 22, 2004.

YY. International Patent Application Serial No. US2005/005490, entitled "Method and System for Eluting Cells", filed Feb. 22, 2005; Publication No. WO05079531, Sep. 1, 2005.

ZZ. U.S. Utility patent application Ser. No. 10/520,763, entitled "Hybrid Polymers for Functional Tuning of Microfludic Device Surfaces", filed Jan. 10, 2005; U.S. Pat. No. 7,381,471, issued Jun. 3, 2008.

AAA. International Patent Application Serial No. US2003/022162, entitled "Hybrid Polymers for Functional Tuning of Microfludic Device Surfaces", filed Jul. 15, 2003; Publication No. 04/007582, Jan. 22, 2004.

BBB. U.S. Utility patent application Ser. No. 10/517,980, entitled "Apparatus and Method for Purification of Nucleic Acids", filed Dec. 13, 2004; U.S. Pat. No. 7,534,623, issued May 19, 2009.

CCC. International Patent Application Serial No. US2003/018403, entitled "Apparatus and Method for Purification of Nucleic Acids", filed Jun. 11, 2003; Publication No. WO03104774, Dec. 18, 2003.

DDD. International Patent Application Serial No. US2004/001276, entitled "Method for Microchip and Capillary Detection of Proteins in the Sub-µG/ML Range", filed Jan. 20, 2004; Publication No. WO 2005/033687, Apr. 14, 2005.

EEE. International Patent Application Serial No. US2003/029249, entitled "Remote Temperature Sensing of Small Volume and Related Apparatus Thereof", filed Sep. 17, 2003; Publication No. WO04027361, Apr. 1, 2004.

FFF. U.S. Utility patent application Ser. No. 10/664,064, entitled "Remote Temperature Sensing of Small Volume and Related Apparatus Thereof", filed Sep. 17, 2003; Publication No. —0131504—, Jul. 8, 2004.

GGG. U.S. Utility patent application Ser. No. 10/432,141, entitled "Method for Orthogonal Analyte Stacking/Injection Systems in Electrophoresis", filed May 16, 2003; Publication No. —0035703—, Feb. 26, 2004.

HHH. International Patent Application Serial No. US01/43259, entitled "METHOD FOR ORTHOGONAL ANALYTE STACKING/INJECTION SYSTEMS IN ELECTROPHORESIS", filed Nov. 19, 2001; Publication No. WO02/48673, Jun. 20, 2002.

III. Thompson, B., et al., "Protein Quantitation from Whole Blood on Polyester-Toner Laser-Printed Microfluidic Discs with Cell Phone Image Analysis", Oct. 26, 2014, pages 1434-1326, XP0553334290, URL:http//www.rsc.org/images/loc/2014/PDFs/Papers/474_0913.pdf.

JJJ. Thompson, B., et al., "Inexpensive, rapid prototyping of microfluidic devices using overhead transparencies and a laser print, cute and laminate fabrication method", Nature Protocols, Vol. 10, No. 6, May 14, 2015, pages 875-886.

KKK. U.S. Patent Application Publication No. US 2007/0166721 A1, Phan, B., et al., "Fluidic Circuits, Methods and Apparatus for Use of Whole Blood Samples in Colorimetric Assays", Jul. 19, 2007.

LLL. U.S. Patent Application Publication No. US 2014/0017802 A1, Smith, E., "Method to Identify Chemical Compounds Using Colorimetric Spot Tests", Jan. 16, 2014.

MMM. Choodum, A., et al., "A sol-gel colorimetric sensor for methamphetamine detection", Sensors and Actuators B: Chemical: International Journal Devoted to Research and Development of Physical and Chemical Transducers, Vol. 215, Apr. 14, 2014, pages 553-450.

NNN. Krauss, S., et al., "First-Generation NARC-DISC™; Cost-Effective Printed Microdevices for Screening of Narcotics at the Point of Interdiction with Cell Phone Detection", 19$^{th}$ International Conference on Miniaturized Systems for Chemistry and Life Sciences, Oct. 29, 2015, pages 1810-1812.

OOO. Krauss, S., et al., "Objective Method for Presumptive Field-Testing of Illicit Drug Possession Using Centrifugal Microdevices and Smartphone Analysis", Analytical Chemistry, Vol. 88, No. 17, Sep. 6, 2016, pages 8689-8697.

PPP. Ouyang, Y., et al., "Multilevel Fluidic Flow Control in a Rotationally-Driven Polyester Film Microdevice Created Using Laser Print, Cut and Laminate", Lab on a Chip, The Royal Society of Chemistry, Dec. 16, 2015, Vol. 16, No. 2, pages 377-387.

QQQ. US. Patent Application Publication No. US 2013/0295602, A1, Fowler, et al., "Methods, Systems and Devices for Multiple Single-Cell Capturing and Processing Using Microfluidics, Nov. 7, 2013.

RRR. U.S. Patent Application Publication No. US 2013/0004956 A1, Landers, et al., "DNA Analyzer", Jan. 3, 2013.

SSS. U.S. Patent Application Publication No. US 2014/0134631 A1, Clime, et al., "Centrifugal Microfluidic Platform", May 15, 2014.

TTT. International Patent Application Serial No. WO 2017/019768 A1, Lee, et al., "Optical Cavity PCR", Feb. 2, 2017.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A microfluidic device for use with a swab and a solvent for colorimetric detection for substance identification, said microfluidic device comprising:
  a microfluidic chip configured to spin;
  a solvent capsule disposed on said microfluidic chip configured to contain said solvent;
  a chamber well disposed on said microfluidic chip configured to receive said swab;
  a microfluidic channel disposed on said microfluidic chip, and in fluidic communication with and between said solvent capsule and said chamber well;
  said solvent capsule is configured to be able open when forces are applied to said solvent capsule to allow said solvent to escape from said solvent capsule;
  said microfluidic channel is configured to allow said escaped solvent to travel via said microfluidic channel to interact with said swab, wherein said swab is intended to be positioned in said chamber well and remain separated from said solvent capsule; and
  wherein said traveling of said escaped solvent to said swab via said microfluidic channel is a result of centrifugal forces exerted on said microfluidic chip as a result of said microfluidic chip spinning.

2. The microfluidic device of claim 1, wherein said microfluidic chip is configured to accept a reagent.

3. The microfluidic device of claim 1, wherein said microfluidic chip comprises a reagent chamber configured to hold a reagent.

4. The microfluidic device of claim 1, wherein said microfluidic chip is configured to be able to allow a reagent to interact with a mixture containing said solvent.

5. The microfluidic device of claim 1, further comprising a kit, wherein said kit includes said solvent contained in said solvent capsule.

6. The microfluidic device of claim 1, further comprising a kit, wherein said kit includes said reagent contained in said reagent chamber.

7. The microfluidic device of claim 1, further comprising a kit, wherein said kit includes said swab.

8. The microfluidic device of claim 1, further comprising a kit, wherein said kit includes said solvent material, reagent material, and one or more swabs.

9. The microfluidic device of claim 1, wherein a mating surface is disposed on said microfluidic device, said mating surface is configured to attach said swab to said microfluidic device.

10. The microfluidic device of claim 9, wherein said mating surface is an adhesive material.

11. The microfluidic device of claim 1, further comprising a handle configured for use with said swab.

12. The microfluidic device of claim 11, wherein said handle is comprised of one or more of the following materials: 3D printed material, plastics, PVC, aluminum, or nylon.

13. The microfluidic device of claim 11, wherein said handle is connected to a retainer.

14. The microfluidic device of claim 11, further comprising a release mechanism that is connected to the handle, wherein said release mechanism is configured to assist in the release of said swab.

15. The microfluidic device of claim 14, wherein said release mechanism comprises a spring.

16. The microfluidic device of claim 11, further comprising an ejector mechanism connected to the handle, said ejector configured to assist in the release of said swab.

17. The microfluidic device of claim 16, wherein said ejector mechanism is configured to attach to a plunger mechanism for releasing said swab from a retainer.

18. The microfluidic device of claim 1, wherein said chamber well is disposed on said microfluidic chip.

19. The microfluidic device of claim 1, wherein said chamber well is attached to said microfluidic chip.

20. The microfluidic device of claim 1, wherein said chamber well is configured to substantially correspond with a shape of said swab.

21. The microfluidic device of claim 1, wherein said chamber well is configured to substantially correspond with a shape of a retainer capable of holding said swab.

22. The microfluidic device of claim 1, further comprising a manifold configured to attach to said microfluidic chip.

23. The microfluidic device of claim 1, further comprising a manifold configured to be disposed on said microfluidic chip.

24. The microfluidic device of claim 23, wherein said manifold has topography which is capable of interlocking with the topography of said microfluidic chip.

25. The microfluidic device of claim 23, wherein said manifold includes an aperture wherein said aperture substantially corresponds to the shape of said swab.

26. The microfluidic device of claim 25, wherein said manifold includes an aperture wherein said aperture substantially corresponds to the shape of a retainer capable of holding said swab.

27. The microfluidic device of claim 23, further comprising said mating surface, wherein said mating surface is disposed on the microfluidic device inside of an aperture of said manifold.

28. The microfluidic device of claim 1, wherein said solvent capsule is comprised of one or more of the following materials: glass, polymers, foil, or plastic.

29. The microfluidic device of claim 1, further comprising a plurality of solvent capsules.

30. The solvent capsule of claim 29, wherein said solvent capsule is configured to contain different solvents.

31. The microfluidic device of claim 1, wherein the forces to open said solvent capsule is caused by human hands.

32. The microfluidic device of claim 1, wherein the forces to open said solvent capsule is caused by a laser.

33. The microfluidic device of claim 1, wherein the forces to open said solvent capsule is caused by being crushed or punctured by an outside device.

34. The microfluidic device of claim 1, wherein said microfluidic device is configured to be able to test for trace presences of multiple substances in a single test.

35. The microfluidic device of claim 1, wherein said microfluidic device is configured to be able to test a plurality of portions of said swab substantially simultaneously.

36. The microfluidic device of claim 1, wherein said microfluidic device is configured to direct said solvent to different regions of said microfluidic chip, with said solvent passing through each of a plurality of said chamber wells being directed to a separate region on said chip.

37. The microfluidic device of claim 1, further comprising a tracking feature disposed on said microfluidic device.

38. The microfluidic device of claim 7, wherein said swab comprises two or more interface surface sections.

39. The microfluidic device of claim 1, further comprising a plurality of chamber wells.

40. The microfluidic device of claim 1, further comprising:
a sample prep chamber disposed on said microfluidic chip; and
a second microfluidic channel disposed on said microfluidic chip in fluid communication with said chamber well and said sample prep chamber, wherein said second microfluidic channel is between said chamber well and said sample prep chamber.

41. The microfluidic device of claim 40, further comprising:
a reagent chamber or detection chamber disposed on said microfluidic chip; and
a third microfluidic channel disposed on said microfluidic chip in fluid communication with said sample prep chamber and said reagent chamber or detection chamber, wherein said third microfluidic channel is between said sample prep chamber and said reagent chamber or detection chamber.

42. The microfluidic device of claim 1, further comprising:
a reagent chamber or detection chamber disposed on said microfluidic chip; and
a second microfluidic channel disposed on said microfluidic chip in fluid communication with said chamber well and said reagent chamber or detection chamber, wherein said second microfluidic channel is between said chamber well and said reagent chamber or detection chamber.

* * * * *